(12) United States Patent
Abotabl et al.

(10) Patent No.: US 12,063,604 B2
(45) Date of Patent: Aug. 13, 2024

(54) SYNCHRONIZATION SIGNAL BLOCK (SSB) IN FULL-DUPLEX

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Chih-Ping Li, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 580 days.

(21) Appl. No.: 17/302,051

(22) Filed: Apr. 22, 2021

(65) Prior Publication Data

US 2021/0337489 A1    Oct. 28, 2021

Related U.S. Application Data

(60) Provisional application No. 63/015,463, filed on Apr. 24, 2020.

(51) Int. Cl.
*H04W 72/0446* (2023.01)
*H04L 1/00* (2006.01)
(Continued)

(52) U.S. Cl.
CPC ......... *H04W 56/001* (2013.01); *H04L 1/0013* (2013.01); *H04L 5/14* (2013.01);
(Continued)

(58) Field of Classification Search
CPC ........... H04W 56/001; H04W 72/0446; H04W 72/0453; H04W 74/0825; H04W 74/0858;
(Continued)

(56) References Cited

U.S. PATENT DOCUMENTS

2011/0235601 A1   9/2011  Yoo et al.
2013/0039331 A1*  2/2013  Koorapaty ............ H04L 5/0048
                                              370/330
(Continued)

FOREIGN PATENT DOCUMENTS

CN        106063178 A      10/2016
CN        109391426 A       2/2019
(Continued)

OTHER PUBLICATIONS

International Search Report and Written Opinion—PCT/US2021/028728—ISA/EPO—Jul. 5, 2021.
(Continued)

*Primary Examiner* — Salvador E Rivas
(74) *Attorney, Agent, or Firm* — Arun Swain

(57) ABSTRACT

Methods related to wireless communication systems and transmission and/or reception of synchronization signal block (SSB) transmissions (e.g., in full-duplex slots) are provided. For example, a wireless communication device receives a synchronization signal block (SSB) transmission schedule. The SSB transmission schedule is at least partially overlapping with an uplink (UL) frequency portion of a full-duplex slot. The wireless communication device receives a first portion of a SSB in a downlink (DL) frequency portion of the full-duplex slot; and receiving a second portion of the SSB in the UL frequency portion of the full-duplex slot based on the SSB being scheduled in the full-duplex slot and at least partially overlapping with the UL frequency portion of the full-duplex slot. Other features are also claimed and described.

30 Claims, 18 Drawing Sheets

(51) Int. Cl.
  *H04L 5/14* (2006.01)
  *H04W 56/00* (2009.01)
  *H04W 72/0453* (2023.01)
  *H04L 5/00* (2006.01)
  *H04L 27/26* (2006.01)

(52) U.S. Cl.
  CPC ... *H04W 72/0446* (2013.01); *H04W 72/0453* (2013.01); *H04L 5/0064* (2013.01); *H04L 27/2666* (2013.01)

(58) Field of Classification Search
  CPC . H04L 1/0067; H04L 5/0064; H04L 27/2666; H04L 27/26025; H04L 12/413
  See application file for complete search history.

(56) References Cited

U.S. PATENT DOCUMENTS

| | | | |
|---|---|---|---|
| 2016/0330011 A1* | 11/2016 | Lee | H04L 5/0066 |
| 2019/0045529 A1 | 2/2019 | Xiong et al. | |
| 2019/0149365 A1 | 5/2019 | Chatterjee et al. | |
| 2019/0150068 A1 | 5/2019 | Montojo et al. | |
| 2019/0159175 A1 | 5/2019 | Islam et al. | |
| 2019/0174466 A1 | 6/2019 | Zhang et al. | |
| 2019/0182783 A1 | 6/2019 | Joung et al. | |
| 2019/0190747 A1 | 6/2019 | Park et al. | |
| 2021/0022069 A1* | 1/2021 | Liu | H04W 48/10 |
| 2021/0029704 A1* | 1/2021 | Zhou | H04W 56/001 |
| 2021/0100038 A1 | 4/2021 | Ly et al. | |
| 2021/0144716 A1 | 5/2021 | Choi et al. | |
| 2021/0160023 A1 | 5/2021 | Liu et al. | |
| 2021/0235457 A1 | 7/2021 | Abedini et al. | |
| 2021/0242916 A1 | 8/2021 | Lomayev et al. | |
| 2021/0243703 A1* | 8/2021 | Wolf | H04W 56/001 |
| 2021/0337495 A1 | 10/2021 | Abotabl | |
| 2021/0337577 A1 | 10/2021 | Sun et al. | |
| 2022/0132524 A1 | 4/2022 | Mueck et al. | |
| 2022/0182160 A1* | 6/2022 | Su | H04B 17/309 |
| 2022/0200675 A1 | 6/2022 | Raghavan et al. | |

FOREIGN PATENT DOCUMENTS

| | | | |
|---|---|---|---|
| CN | 110710281 A | 1/2020 | |
| EP | 3972181 A1 | 3/2022 | |
| JP | 2020533833 A | 11/2020 | |
| KR | 102021315 B1 | 9/2019 | |
| KR | 20200054086 A | 5/2020 | |
| WO | 2019099661 A1 | 5/2019 | |
| WO | WO-2019099443 A1 * | 5/2019 | H04L 5/0048 |
| WO | 2019142512 A1 | 7/2019 | |
| WO | 2019174069 A1 | 9/2019 | |
| WO | 2019216750 A1 | 11/2019 | |
| WO | 2020068251 A1 | 4/2020 | |
| WO | 2020072521 A1 | 4/2020 | |
| WO | 2020199734 A1 | 10/2020 | |

OTHER PUBLICATIONS

LG Electronics: "Handling the Legacy Transmission in ABS", 3GPP Draft, 3GPP TSG RAN WG1 Meeting #66 R1-112332, 3RD Generation Partnership Project (3GPP), Mobile Competence Centre, 650, Route Des Lucioles, F-06921 Sophia-Antipolis Cedex, France, vol. RAN WG1, No. Athens, Greece, Aug. 22, 2011, Aug. 16, 2011 (Aug. 16, 2011), XP050537469, pp. 1-4, [retrieved on Aug. 16, 2011] Section 3.

Chakravarthy V et al.: "TDCS, OFDM, and MC-CDMA: A brief tutorial" IEEE Communciations Magazine, IEEE Service Center, Piscataway, US, vol. 43, No. 9, Sep. 1, 2005, pp. S11-S16, XP011139515.

* cited by examiner

SYNCHRONIZATION SIGNAL BLOCK (SSB) IN FULL-DUPLEX

CROSS REFERENCE TO RELATED APPLICATIONS

The present application claims benefit of priority to U.S. Provisional Patent Application No. 63/015,463, filed Apr. 24, 2020, which is hereby incorporated by reference in its entirety as if fully set forth below and for all applicable purposes.

The present application is related to co-filed U.S. application Ser. No. 17/302,043 also filed on 22 Apr. 2021, which claims priority to U.S. Provisional Patent Application No. 63/015,458

TECHNICAL FIELD

The technology described below relates generally to wireless communication systems, and more particularly to synchronization signal block (SSB) transmissions in full-duplex slots. Certain aspects can enable and provide techniques allowing communication devices (e.g., user equipment devices or base stations) to communicate SSBs when an SSB transmission schedule overlaps with a portion (e.g., an uplink (UL) band) in a full-duplex slot. Techniques discussed herein enable and provide flexible duplexing techniques affording higher reliability and low latency communication devices, methods, and systems.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices (e.g., user equipment (UE)).

To meet the growing demands for expanded mobile broadband connectivity, wireless communication technologies are advancing from the long term evolution (LTE) technology to a next generation new radio (NR) technology, which may be referred to as 5th Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum. As use cases and diverse deployment scenarios continue to expand in wireless communication, full-duplex communication technique improvements may also yield benefits.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Some aspects of the present disclosure enable and provide mechanisms and techniques for handling overlaps between preconfigured synchronization signal blocks (SSBs) and an uplink (UL) band when operating in a full-duplex mode. For example, a base station (BS) may utilize a combination of downlink (DL) slots, UL slots, and full-duplex slots for communications with user equipment (UE) devices. In some aspects, when a BS determines that a preconfigured SSB transmission schedule is at least partially overlapping with an UL uplink in a full-duplex slot, the BS may perform SSB transmission by excluding at least the UL band in the full-duplex slot. In some other aspects, the BS may transmit an SSB in the full-duplex slot regardless of the SSB having an overlap with at least a portion of the UL band in the full-duplex slot. The BS may also schedule a UE with an UL allocation in the full-duplex slot. The UE may determine whether to transmit an UL transmission according to the UL allocation or apply puncturing or rate-match to the UL transmission based on whether the BS accounts for the overlap in the SSB transmission.

For example, in an aspect of the disclosure, a method of wireless communication performed by a wireless communication device, includes determining whether a synchronization signal block (SSB) is scheduled in a full-duplex slot and at least partially overlapping with an uplink (UL) band in the full-duplex slot. The method also includes receiving a first portion of the SSB from a downlink (DL) band in the full-duplex slot; and receiving a second portion of the SSB from the UL band in the full-duplex slot based on the SSB being scheduled in the full-duplex slot and at least partially overlapping with the UL band in the full-duplex slot.

In an additional aspect of the disclosure, a method of wireless communication performed by a base station, including determining whether a synchronization signal block (SSB) is scheduled in a full-duplex slot and at least partially overlapping with an uplink (UL) band in the full-duplex slot. The method also includes transmitting a first portion of the SSB in a downlink (DL) band in the full-duplex slot; and transmitting a second portion of the SSB in the UL band in the full-duplex slot based on the SSB being scheduled in the full-duplex slot and at least partially overlapping with the UL band in the full-duplex slot.

In an additional aspect of the disclosure, a wireless communication device includes a processor configured to determine whether a synchronization signal block (SSB) is scheduled in a full-duplex slot and at least partially overlapping with an uplink (UL) band in the full-duplex slot. The wireless communication device also includes a transceiver configured to receive a first portion of the SSB from a downlink (DL) band in the full-duplex slot. The transceiver is also configured to receive a second portion of the SSB from the UL band in the full-duplex slot based on the SSB being scheduled in the full-duplex slot and at least partially overlapping with the UL band in the full-duplex slot.

In an additional aspect of the disclosure, a base station (BS) includes a processor configured to determine whether a synchronization signal block (SSB) is scheduled in a full-duplex slot and at least partially overlapping with an uplink (UL) band in the full-duplex slot. The BS also includes a transceiver configured to transmit a first portion of the SSB in a downlink (DL) band in the full-duplex slot. The transceiver is also configured to transmit a second portion of the SSB in the UL band in the full-duplex slot based on the SSB being scheduled in the full-duplex slot and at least partially overlapping with the UL band in the full-duplex slot.

In an additional aspect of the disclosure, a non-transitory computer-readable medium having program code recorded thereon, the program code includes code for causing a wireless communication device to determine whether a synchronization signal block (SSB) is scheduled in a full-duplex slot and at least partially overlapping with an uplink (UL) band in the full-duplex slot. The program also includes code for causing the wireless communication device to receive a first portion of the SSB from a downlink (DL) band in the full-duplex slot. The program also includes code for causing the wireless communication device to receive a second portion of the SSB from the UL band in the full-duplex slot based on the SSB being scheduled in the full-duplex slot and at least partially overlapping with the UL band in the full-duplex slot.

In an additional aspect of the disclosure, a non-transitory computer-readable medium having program code recorded thereon, the program code includes code for causing a base station (BS) to determine whether a synchronization signal block (SSB) is scheduled in a full-duplex slot and at least partially overlapping with an uplink (UL) band in the full-duplex slot. The program also includes code for causing the BS to transmit a first portion of the SSB in a downlink (DL) band in the full-duplex slot. The program also includes code for causing the BS to transmit a second portion of the SSB in the UL band in the full-duplex slot based on the SSB being scheduled in the full-duplex slot and at least partially overlapping with the UL band in the full-duplex slot.

In an additional aspect of the disclosure, a wireless communication device includes means for determining whether a synchronization signal block (SSB) is scheduled in a full-duplex slot and at least partially overlapping with an uplink (UL) band in the full-duplex slot. The wireless communication device also includes means for receiving a first portion of the SSB from a downlink (DL) band in the full-duplex slot. The wireless communication device also includes means for receiving a second portion of the SSB from the UL band in the full-duplex slot based on the SSB being scheduled in the full-duplex slot and at least partially overlapping with the UL band in the full-duplex slot.

In an additional aspect of the disclosure, a base station (BS) includes means for determining whether a synchronization signal block (SSB) is scheduled in a full-duplex slot and at least partially overlapping with an uplink (UL) band in the full-duplex slot. The wireless communication device also includes means for transmitting a first portion of the SSB in a downlink (DL) band in the full-duplex slot. The wireless communication device also includes means for transmitting a second portion of the SSB in the UL band in the full-duplex slot based on the SSB being scheduled in the full-duplex slot and at least partially overlapping with the UL band in the full-duplex slot In an additional aspect of the disclosure, a method of wireless communication performed by a wireless communication device. The method includes receiving a synchronization signal block (SSB) transmission schedule, the SSB transmission schedule at least partially overlapping with an uplink (UL) frequency portion of a full-duplex slot; receiving a first portion of a SSB in a downlink (DL) frequency portion of the full-duplex slot; and receiving a second portion of the SSB in the UL frequency portion of the full-duplex slot based on the SSB being scheduled in the full-duplex slot and at least partially overlapping with the UL frequency portion of the full-duplex slot.

In an additional aspect of the disclosure, a method of wireless communication performed by a wireless communication device. The method includes transmitting a synchronization signal block (SSB) transmission schedule, the SSB transmission schedule at least partially overlapping with an uplink (UL) frequency portion of a full-duplex slot; transmitting a first portion of a SSB in a downlink (DL) frequency portion of the full-duplex slot; and transmitting a second portion of the SSB in the UL frequency portion of the full-duplex slot based on the SSB being scheduled in the full-duplex slot and at least partially overlapping with the UL frequency portion of the full-duplex slot.

In an additional aspect of the disclosure, a wireless communication device includes a memory; a transceiver; and at least one processor coupled to the memory and the transceiver, where the wireless communication device is configured to receive a synchronization signal block (SSB) transmission schedule, the SSB transmission schedule at least partially overlapping with an uplink (UL) frequency portion of a full-duplex slot; receive, via the transceiver, a first portion of a SSB from a downlink (DL) frequency portion of the full-duplex slot; and receive, via the transceiver, a second portion of the SSB from the UL frequency portion of the full-duplex slot based on the SSB being scheduled in the full-duplex slot and at least partially overlapping with the UL frequency portion of the full-duplex slot.

In an additional aspect of the disclosure, a wireless communication device includes a memory; a transceiver; and at least one processor coupled to the memory and the transceiver, where the wireless communication device is configured to transmit a synchronization signal block (SSB) transmission schedule, the SSB transmission schedule at least partially overlapping with an uplink (UL) frequency portion of a full-duplex slot; transmit, via the transceiver, a first portion of a SSB in a downlink (DL) frequency portion of the full-duplex slot; and transmit, via the transceiver, a second portion of the SSB in the UL frequency portion of the full-duplex slot based on the SSB being scheduled in the full-duplex slot and at least partially overlapping with the UL frequency portion of the full-duplex slot.

In still yet other aspects, some deployments can include a wireless communication method performed by a wireless device. The wireless device can be many types of devices configured for wireless radio-frequency (RF) communications (e.g., UE, BS, centralized unit (CU), distributed unit (DU), radio unit (RU), wireless nodes having a variety of functions, etc). The wireless device can be equipped for communications including receiving sync signaling information (e.g., SSB signaling). The SSB signaling may be partitioned into one or more parts or components (e.g., first portion, second portion, . . . . N portion). The wireless device can be configured to communicate in various duplex modes (e.g., full or half). In some deployments, communication may occur within the context of a given communication structure (e.g., transmission time interval (TTI), subframe, frame, or slot). Some scenarios and techniques discussed herein include communications occurring within a full-duplex slot. A full duplex slot may have one or more bands or portions for simultaneous transmission and reception. For instance, at least one of the frequency bands or portions is for transmission and at least another one of the frequency bands or portions is for reception concurrent with the transmission. As one example, a full-duplex slot may have a first portion that is an UL band and a second portion that is a DL band. Communications in the UL or DL bands may be via communication links corresponding to uplink transmission, downlink transmissions, or both. In some scenarios, SSB signaling may be multiple portions and partially overlap bands in a full-duplex slot.

Other aspects, features, and embodiments will become apparent to those of ordinary skill in the art, upon reviewing the following description of specific, exemplary aspects in conjunction with the accompanying figures. While features may be discussed relative to certain aspects and figures below, all aspects can include one or more of the advantageous features discussed herein. In other words, while one or more aspects may be discussed as having certain advantageous features, one or more of such features may also be used in accordance with the various aspects discussed herein. In similar fashion, while exemplary aspects may be discussed below as device, system, or method aspects it should be understood that such exemplary aspects can be implemented in various devices, systems, and methods.

DETAILED DESCRIPTION

Figure 1:
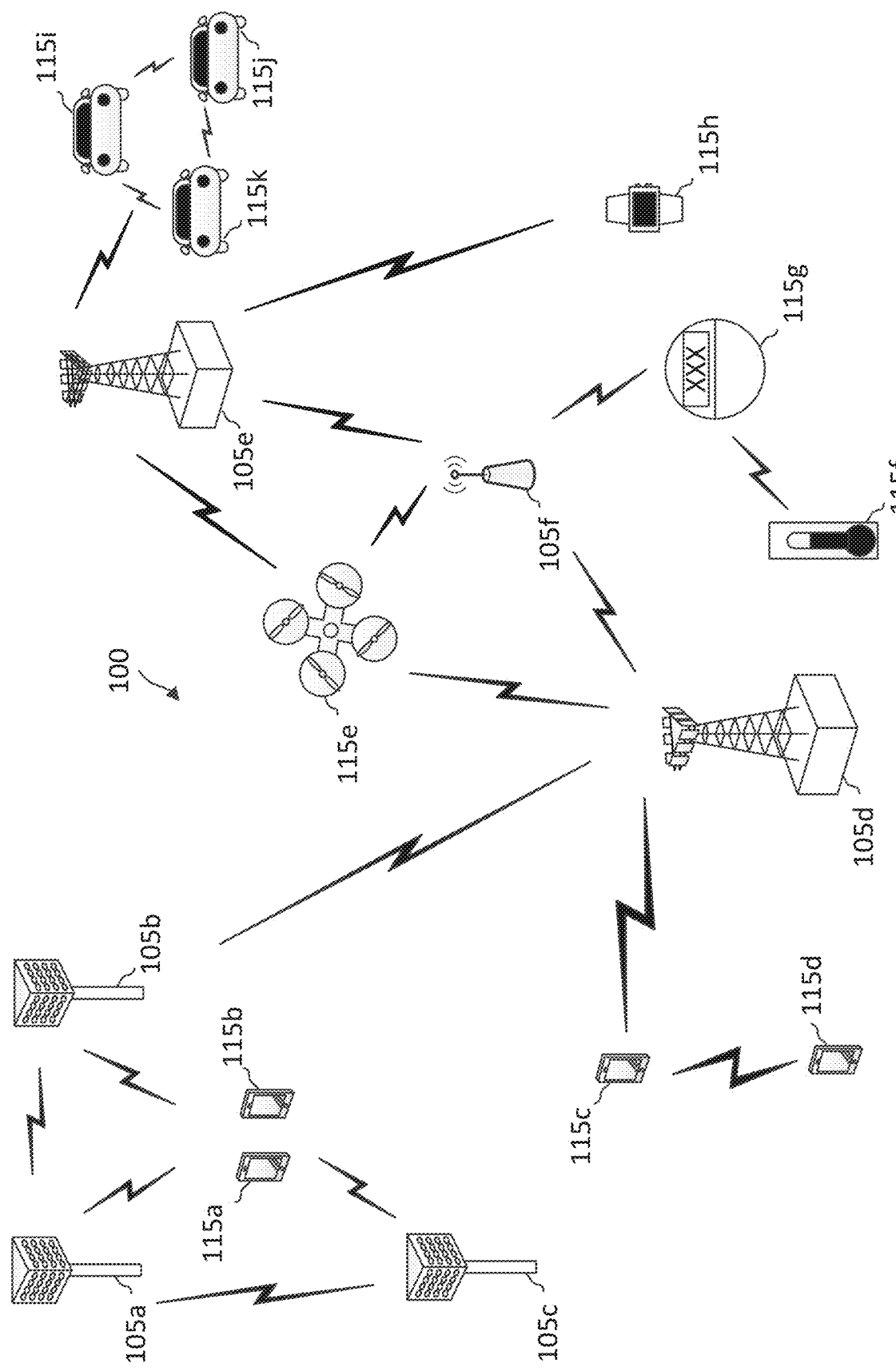
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI). Additional features may also include having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In a wireless communication network, a BS and/or a UE may support full-duplex communications. Full-duplex communications refer to simultaneous transmission and reception of signals in the same frequency band. However, one main issue with full-duplex communications is self-interference. Self-interference refers to signal leakage from a local transmitter to a local receiver. In an example, a BS may simultaneously transmit a DL signal and receive a UL signal via transmit antennas and receive antennas, respectively, at the BS. During the simultaneous DL transmission and UL reception in the same frequency band, the DL signal may leak from the transmit antennas into the receive antennas, and thus causing self-interference from the transmitted DL signal to the received UL signal at the BS. In another example, a UE may simultaneously transmit a UL signal to a BS and receive a DL signal from the BS in the same frequency band. Similarly, the simultaneous UL transmission and DL reception may cause self-interference from the UL transmission to the DL reception at the UE. In a further example, a UE may communicate with multiple transmission-reception points (TRPs) and may simultaneously transmit a UL signal to one TRP and receive a DL signal from another TRP in the same frequency band. Again, the simultaneous UL transmission and DL reception may cause self-interference from the UL transmission to the DL reception at the UE.

Full-duplex communications may be configured in various modes, for example, an in-band full-duplex (IBFD) mode and/or a subband full-duplex (SBFD) mode. In an IBFD mode, an UL band can be fully overlapping with a DL band or partially overlapping with the DL band within a channel frequency bandwidth. In an SBFD mode, a channel frequency bandwidth may include an UL band spaced apart from a DL band by a small or narrow guard band. The SFBD mode differs from a FDD mode in the frequency separation between the UL band and the DL band being significantly smaller or narrower than in the FDD mode. Additionally, the SFBD mode may operate over a single unpaired spectrum band, while the FDD mode operates over a paired spectrum including a UL spectrum band and a DL spectrum band.

In a wireless communication network, a BS may transmit synchronization signal blocks (SSBs) to assist UEs in accessing the network. An SSB may include synchronization signals, such as a primary synchronization signal (PSS) and a secondary synchronization signals (SSS), and a physical broadcast channel (PBCH) signal. The BS may preconfigure an SSB transmission schedule. The SSB transmission schedule may be periodic, for example, repeating at a periodicity of about 20 (milliseconds) ms, 40 ms, or 80 ms. The SSB transmission schedule can comprise one or more time and/or resources for assigning or scheduling communications (e.g., downlink, uplink, sidelink, transmissions, receptions, etc.). In some aspects, the BS may employ a combination of a full-duplex mode, a DL-only mode, and a UL-only mode for communications with UEs over a single channel frequency band (e.g., an unpaired spectrum band). For instance, the BS may configure some transmission slots to be DL slots for DL communications and some transmission slots to be UL slots for UL communications. The BS may also configure some transmission slots to be full-duplex slots for simultaneous UL and DL communications. The BS may determine the slot configurations, for example, depending on traffic needs in the UL direction and in the DL direction. When the BS utilizes a combination of DL slots, UL slots, and full-duplex slots, the preconfigured or pre-scheduled SSBs may fall in a full-duplex slot.

Various mechanisms and techniques for handling overlaps between preconfigured SSBs and an UL band when operating in a full-duplex mode are discussed herein. For example, a BS may determine a preconfigured SSB transmission schedule. The preconfigured schedule may include certain resources (e.g., time-frequency resources or resource blocks) preconfigured for SSB transmission and may be repeated at a certain periodicity. The BS may also utilize a combination of DL slots, UL slots, and full-duplex slots for communications with UEs. In some aspects, when a BS determines that the preconfigured SSB transmission schedule is at least partially overlapping with an UL uplink in a full-duplex slot, the BS may perform SSB transmission by excluding at least the UL band in the full-duplex slot. In some other aspects, the BS may transmit an SSB in the full-duplex slot regardless of the SSB having an overlap with at least a portion of the UL band in the full-duplex slot.

The BS may exclude the UL band from an SSB transmission in a full-duplex slot using various techniques. In some aspects, the BS may mute the SSB transmission in the full-duplex slot. In some examples, the BS may configure a UE with an SSB muting pattern. Alternatively, the muting of the SSB transmission can be based on a predetermined configuration. In some aspects, the BS may transmit the SSB in the full-duplex slot as scheduled. For instance, the BS may transmit a first portion of the SSB in a DL band in the full-duplex slot as scheduled and puncture a second portion of the SSB that overlaps with the UL band in the full-duplex slot. In some instances, the BS may additionally transmit the second portion of the SSB in the same DL band as the first portion. The second portion can be transmitted at a resource adjacent to a resource of the first portion in frequency. In some aspects, the BS may transmit the SSB in the full-duplex slot by frequency-shifting the SSB such that the SSB may be completely within a DL band in the full-duplex slot. In some examples, the amount of frequency-shift can be predetermined. For example, the SSB can be shifted such that the SSB may be aligned to a high frequency edge or a low frequency edge of the DL after the frequency-shift. In some other examples, the amount of frequency-shift can be configurable. In some aspects, the BS may partition the SSB into multiple portions and transmit each portion within a DL band in the full-duplex slot, for example, when the full-duplex slot does not include a DL band wide enough to accommodate the entire SSB. In some aspects, the BS may reduce a frequency BW of the SSB and transmit the entire SSB in a DL band of the full-duplex slot using more symbols than as scheduled. In other words, the BS may transmit the SSB with a smaller BW in an extended duration. In some instances, the BS may transmit a first set of SSBs in DL slots based on a first periodicity and transmit a second set of SSBs in full-duplex slots based on a second periodicity different from the first periodicity.

In some aspects, the BS may schedule a UE with an UL allocation in a full-duplex slot. If the UE determines that the BS has accounted for the SSB and UL band overlaps and avoid transmitting the SSB in the UL band, the UE may proceed with transmitting an UL transmission according to the UL allocation. However, if the UE determines that an SSB is scheduled in the full-duplex slot and the SSB is at least partially overlapping with the UL allocation, the UE may disregard the UL allocation. Alternatively, the UE may proceed with transmitting an UL communication signal according to the UL allocation, but may apply puncturing or rate-match to avoid interfering with the SSB.

Aspects of the present disclosure can provide several benefits. For example, excluding SSB transmission in a UL band within a full-duplex slot can avoid interference between the SSB transmission to an UL transmission in the full-duplex slot. On the other hand, proceeding with SSB transmission regardless of having an overlap between an SSB and a UL band in a full-duplex slot can be simple to implement, but may have to rely on a UE in handling the overlap (e.g., by disregarding a UL allocation in the full-duplex slot or applying puncturing or rate-match to a UL transmission in the full-duplex slot). While the present disclosure is described in the context of handling SSBs and UL allocations between a BS and a UE in a wireless access network, the present disclosure can be applied to a wireless integrated access-backhaul (IAB) network.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

Figure 3A:
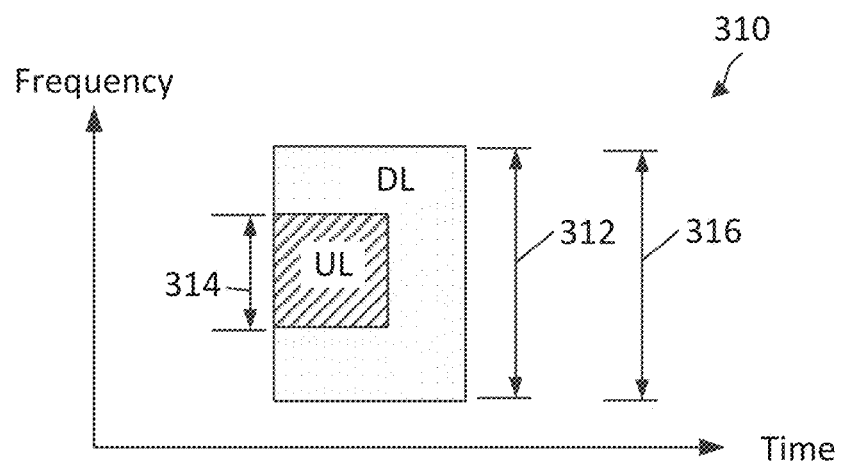
FIG. 3A illustrates a full-duplex communication configuration according to some aspects of the present disclosure.
Figure 3B:
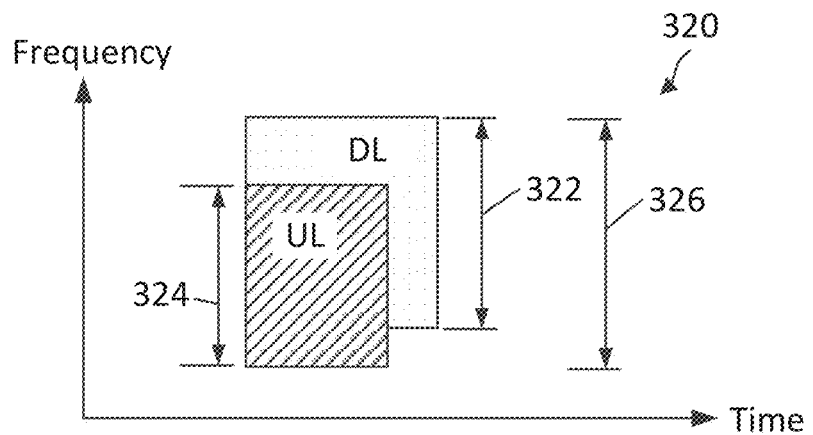
FIG. 3B illustrates a full-duplex communication configuration according to some aspects of the present disclosure.
Figure 3C:
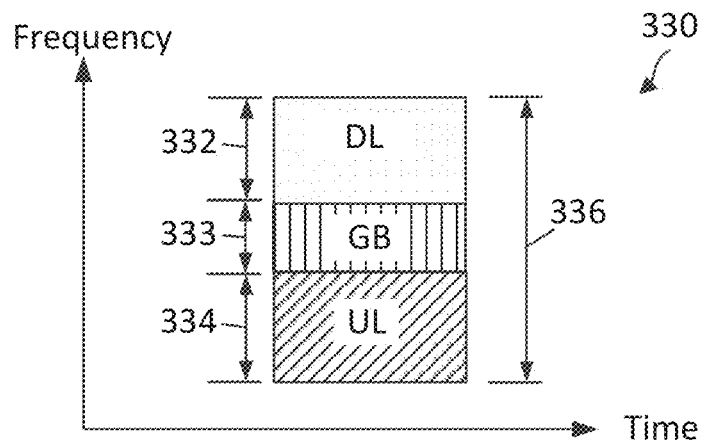
FIG. 3C illustrates a full-duplex communication configuration according to some aspects of the present disclosure.
Figure 4:
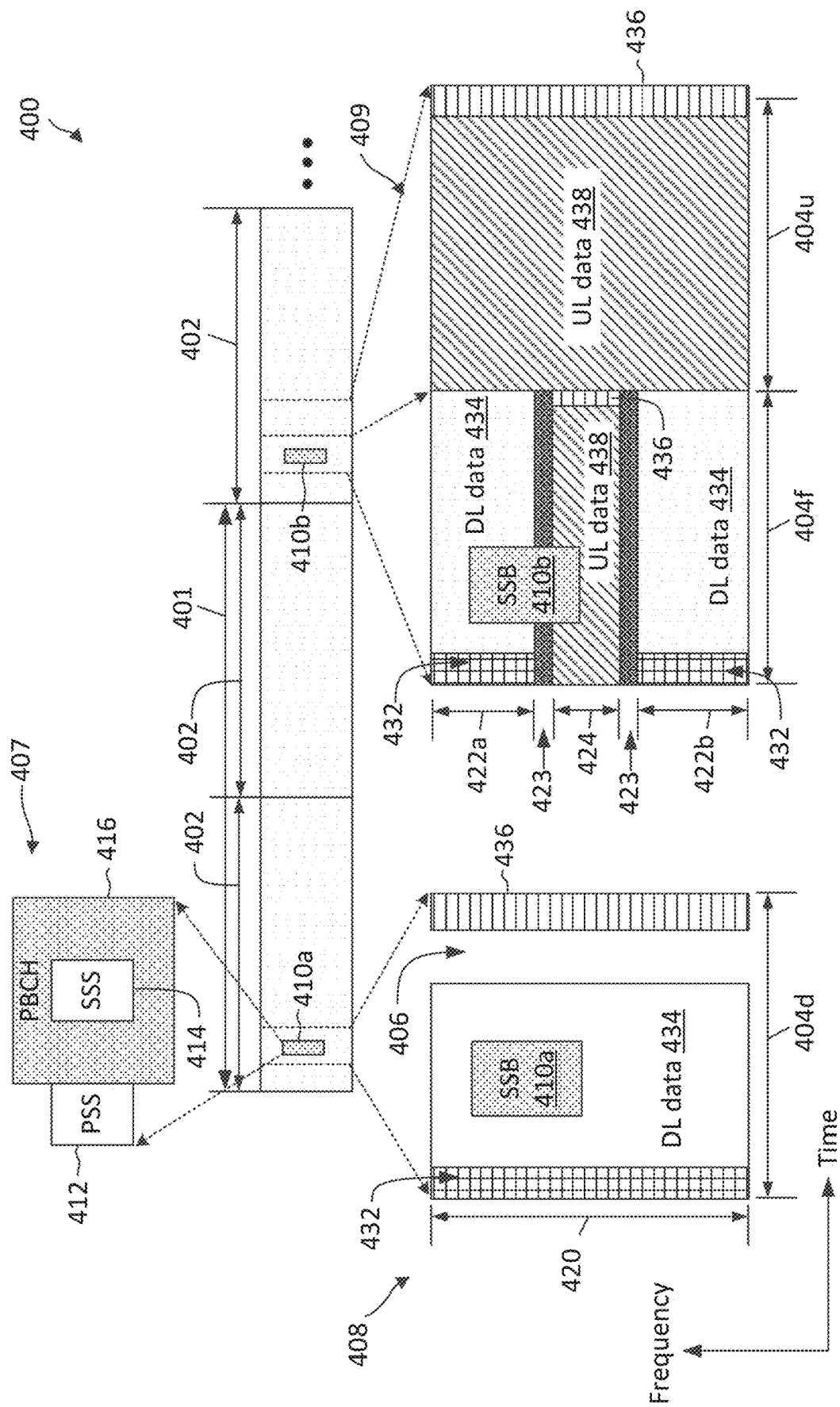
FIG. 4 illustrates a synchronization signal block (SSB) communication scenario according to some aspects of the present disclosure.

In some aspects, the BSs 105 and/or the UEs 115 may support half-duplex communications. For instance, a BS 105 may transmit a DL transmission to a UE 115 during one period and receive a and a UL transmission from the UE 115 during another period. In some aspects, the BSs 105 and/or the UEs 115 may also support full-duplex communications. For instance, a BS 105 may employ a combination of a full-duplex mode, a DL-only mode, and a UL-only mode for communications with UEs 115. For instance, the BS 105 may configure some transmission slots to be DL slots for DL communications and some transmission slots to be UL slots for UL communications. The BS may also configure some transmission slots to be full-duplex slots for simultaneous UL and DL communications. The DL slots, UL slots, and full-duplex slots may be in different time periods. The BS may determine whether to configure a certain slot to be a DL slot, a UL slot, or a full-duplex slot, for example, depending on traffic needs in the UL direction and in the DL direction. A DL slot may include a DL band spanning a channel frequency BW (e.g., in a single unpaired spectrum band). A UL slot may include a UL band spanning the channel frequency BW. The DL slot and UL slot may also be referred to as half-duplex slots. A full-duplex slot may include a UL band and a DL band within the channel BW. The full-duplex slot can be an IBFD slot, where the UL band is fully overlapping with the DL band or partially overlapping with the DL band. Overlap may occur in one or more various parameters. Such parameters can include one or more of time, frequency, size, duration, shape, contents, full, partial, etc. Alternatively, the full-duplex slot can be an SBFD slot, where the UL band is spaced apart from the DL band in frequency by a small guard band. The IBFD and SFBD configurations will be described more fully below in relation to FIGS. 3A-3C When the BS 105 utilizes a combination of DL slots, UL slots, and full-duplex slots, a preconfigured or pre-scheduled SSB may fall in a full-duplex slot (e.g., as shown in FIG. 4). In some aspects, when an SSB is scheduled in a full-duplex slot and the SSB is at least partially overlapping with an UL band in the full-duplex slot, the BS 105 may utilize various techniques to refrain from transmitting the SSB in the UL band to avoid interference with UL communication. In some instances, the BS 105 may mute the SSB transmission in the full-duplex slot. In some instances, the BS 105 may transmit the SSB in the full-duplex slot by puncturing a portion of the SSB that is overlapping with the UL band in the full-duplex slot. In some instances, the BS 105 may transmit the SSB in the full-duplex slot by frequency-shifting the SSB such that the SSB may be completely within a DL band in the full-duplex slot. In some instances, the BS 105 may partition the SSB into multiple portions and transmit each portion within a DL band in the full-duplex slot. In some instances, the BS 105 may transmit the SSB using a BW narrower than the SSB BW in an extended time duration (e.g., using more symbols than the scheduled symbols) such that the entire SSB may be transmitted within a DL band in the full-duplex slot. In some other aspects, the BS 105 may transmit the SSB in the full-duplex slot with the SSB overlapping with the UL band. A UE 115 with an UL allocation in the UL band may skip the UL transmission or apply puncturing or rate-match to avoid transmission in the resources overlapped with the SSB. Mechanisms for communicating SSBs in a full-duplex slot are described in greater detail herein.

In some aspects, the network 100 may be a wireless IAB network. The network 100 may employ a multi-hop topology (e.g., a spanning tree) to transport access traffic and backhaul traffic. For instance, one BS 105 may be configured with an optical fiber connection in communication with a core network and may act as a root node or anchoring node to transport backhaul traffic between the core network and the network 100. The other BSs 105 may operate as relay nodes forming the multi-hop topology. For instance, a BS 105 may have one or more parent nodes in an upstream direction (towards the core network). These parent nodes can include other BSs 105. A BS 105 may also have one or more child nodes in a downstream direction. Theses child nodes may include BSs 105 and/or UEs 115. In other words, a BS 105 may operate as a parent node to a downstream child node and may operate as a child node to an upstream parent node. When a BS 105 operates as a parent node, the BS 105 may implement functions of a BS and communicate with a child node over-the-air. When the BS 105 operates as a child node, the BS 105 may implement functions of a UE and communicate with a parent node over-the-air. In some instances, a parent node may be referred to as an IAB-distribution unit (IAB-DU), and a child mode may be referred to as an IAB-MT node. A UE 115 may operate as a child node in the multi-hop topology. In some aspects, an IAB-DU node may also communicate with an IAB-MT node using full-duplex communications. Accordingly, aspects of the SSB communications in the full-duplex mode may also apply to communications between an IAB-DU node and an IAB-MT node.

Figure 2:
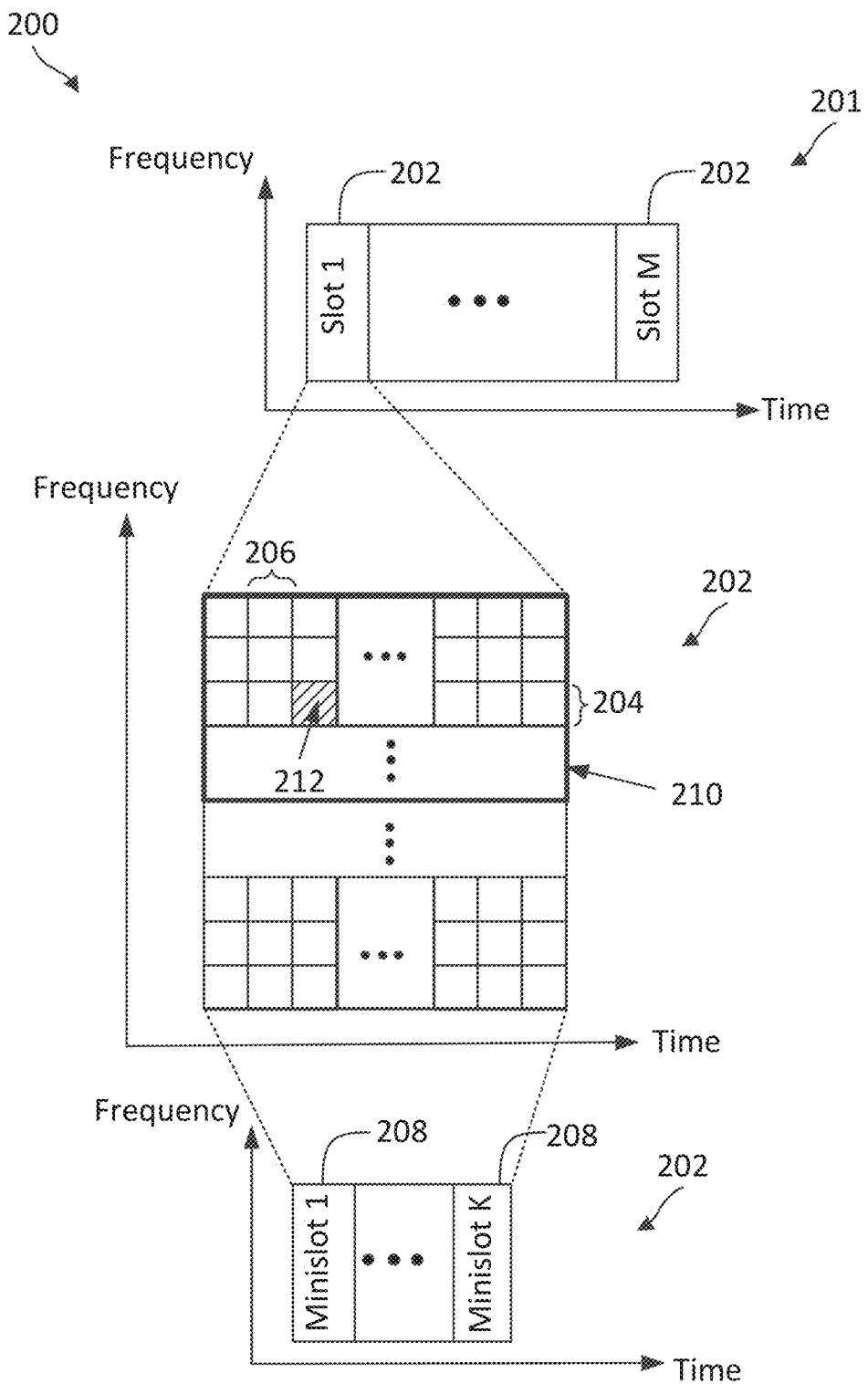
FIG. 2 illustrates a radio frame structure according to some aspects of the present disclosure.

FIG. 2 illustrates a radio frame structure 200 according to some aspects of the present disclosure. The radio frame structure 200 may be employed by BSs such as the BSs 105 and UEs such as the UEs 115 in a network such as the network 100 for communications. In FIG. 2, the x-axes represent time in some arbitrary units and the y-axes represent frequency in some arbitrary units. The transmission frame structure 200 includes a radio frame 201. The duration of the radio frame 201 may vary depending on the aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the aspects, for example, based on the channel bandwidth, the subcarrier spacing (SCS), and/or the CP mode. One subcarrier 204 in frequency and one symbol 206 in time forms one resource element (RE) 212 for transmission. A resource block (RB) 210 is formed from a number of consecutive subcarriers 204 in frequency and a number of consecutive symbols 206 in time.

In an example, a BS (e.g., BS 105 in FIG. 1) may schedule a UE (e.g., UE 115 in FIG. 1) for UL and/or DL communications at a time-granularity of slots 202 or mini-slots 208. Each slot 202 may be time-partitioned into K number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N–1) symbols 206. In some aspects, a mini-slot 208 may have a length of about two symbols 206, about four symbols 206, or about seven symbols 206. In some examples, the BS may schedule UE at a frequency-granularity of a resource block (RB) 210 (e.g., including about 12 subcarriers 204).

A slot 202 may be configured as a DL slot with a DL band spanning a channel frequency BW, a UL slot with a UL band spanning a channel frequency BW, or a full-duplex slot including a UL band and a DL band in a channel frequency BW. FIGS. 3A-3C illustrate various full-duplex configurations. In these sample configurations, various types of overlap scenarios are shown. Overlap can include relative placement or positioning from the perspective of various parameters. Sample parameters can include one or more of time, frequency, size, duration, shape, contents, full, partial, etc. Various of these parameters are illustrated in FIGS. 3A-3C.

FIG. 3A illustrates a full-duplex communication configuration 310 according to some aspects of the present disclosure. The configuration 310 may be employed by a BS 105 and a UE 115 in a network such as the network 100 in conjunction with the radio frame structure 200 for communications. In FIG. 3A, the x-axis represents time in some arbitrary units, and the y-axis represents frequency in some arbitrary units. In the configuration 310, a UL band 314 may be fully overlapping with a DL band 312 in a channel frequency BW 316 (e.g., in a single unpaired spectrum band). As shown, the UL band 314 is within the DL band 312. The UL band 314 may be used for UL transmissions by the UE 115. The DL band 312 may be used for DL transmissions by the BS 105. The configuration 310 may be referred to as an IBFD mode.

FIG. 3B illustrates a full-duplex communication configuration 320 according to some aspects of the present disclosure. The configuration 320 may be employed by a BS 105 and a UE 115 in a network such as the network 100 in conjunction with the radio frame structure 200 for communications. In FIG. 3B, the x-axis represents time in some arbitrary units, and the y-axis represents frequency in some arbitrary units. In the configuration 320, a UL band 324 may be partially overlapping with a DL band 322 in a channel frequency BW 326 (e.g., in a single unpaired spectrum band). The UL band 324 may be used for UL transmissions by the UE 115. The DL band 322 may be used for DL transmissions by the BS 105. The configuration 320 may also be referred to as an IBFD mode.

FIG. 3C illustrates a full-duplex communication configuration 330 according to some aspects of the present disclosure. The configuration 330 may be employed by a BS such as the BSs 105 and a UE such as the UEs 115 in a network such as the network 100 in conjunction with the radio frame structure 200 for communications. In FIG. 3C, the x-axis represents time in some arbitrary units, and the y-axis represents frequency in some arbitrary units. In the configuration 330, a UL band 334 may be spaced apart from a DL band 332 by a guard band 333 in a channel frequency BW 336 (e.g., in a single unpaired spectrum band). The UL band 334 may be used for UL transmissions by the UE 115. The DL band 332 may be used for DL transmissions by the BS 105. The guard band 333 may be small or narrow, for example, including about 5 RBs (e.g., the RBs 210). The configuration 320 may be referred to as an SFBD mode.

FIG. 4 illustrates an SSB communication scenario 400 according to some aspects of the present disclosure. The scenario 400 may correspond to an SSB communication scenario in the network 100. In the scenario 400, a BS 105 may preconfigure an SSB transmission schedule. The x-axis represents time in some arbitrary units, and the y-axis represents frequency in some arbitrary units. The BS 105 may schedule SSBs 410 to be transmitted periodically, for example, at a periodicity of about 10 ms, 20 ms, 40 ms, or 80 ms or more).

In the illustrated example of FIG. 4, the BS 105 may transmit an SSB 410 in every other radio frame 402 (e.g., a repeating interval 401). The SSBs are shown as 410a and 410b. The radio frame 402 may have a frame structure similar to the structure 200. For instance, each radio frame 402 may have a duration of about 10 ms. Although FIG. 4 illustrates the BS 105 transmitting one SSB 410 in each SSB repeating interval 401, it should be understood that in other examples the BS 105 may transmit an SSB burst including any suitable number of SSBs 410 in a repeating interval 401. For instance, for an SCS of 15 kHz and a carrier frequency below 3 GHz, the BS 105 may transmit about 2 SSBs 410, one after another in time within a repeating interval 401. Additionally, the BS 105 may transmit SSBs 410 in an SSB burst in different beam directions. Further, the time and/or frequency locations of SSBs 410 and/or the number of SSBs 410 in each repeating interval 401 may vary depending on the SCS and other parameters, such as the carrier frequency or channel frequency.

In NR or 5G, an SCS may be 15 kHz, 30 kHz, 60 kHz, 120 kHz, or 240 kHz, a carrier frequency can be below 3 GHz, between 3 GHz to about 6 GHz, or greater than 6 GHz, and SSB bursts may be transmitted in a first half of a radio frame 402 (e.g., the beginning 5 ms of the radio frame 402). In some instances, the BS 105 may transmit all the prescheduled SSBs 410. In some other instances, the BS 105 may mute one or more of the prescheduled SSBs 410. Muting may refer to the BS 105 not performing a certain transmission. For instance, the BS 105 may transmit a ssb-PositionsInBurst information element, for example, in a SIB, to indicate whether an SSB within an SSB burst is muted. The ssb-PositionsInBurst information element may include an array of bits each corresponding to an SSB in the SSB burst. The BS 105 may set a bit in the array to a value of 1 to indicate that a corresponding SSB will be transmitted. The BS 105 may set a bit in the array to a value of 0 to indicate that a corresponding SSB will not be transmitted or muted.

The BS 105 may transmit a PSS 412, an SSS 414 and a PBCH signal 416 in each SSB 410 as shown in the expanded view 407. The PSS 412 and the SSS 414 may assist a UE 115 in synchronizing to the network and may provide cell identity information. The PBCH signal 416 may carry a MIB indicating network system information, such as an SCS used by the network and/or resources where the BS 105 may transmit SIB scheduling information.

As discussed above, the BS 105 may configure a combination of DL slots, UL slots, and/or full-duplex slots in a channel frequency BW. As an example, the BS 105 may transmit the SSB 410a in a DL slot 404d as shown in the expanded view 408. The DL slot 404d may include a DL band 420. The DL band 420 may correspond to a channel frequency BW (e.g., the channel frequency BW 316, 326, and/or 336). The channel frequency BW may be at any suitable frequency band (e.g., below 3 GHz, between about 3 GHz to about 6 GHz, or above 6 GHz). The channel frequency BW may include any suitable amount of frequencies (e.g., about 20 MHz, about 80 MHz, about 100 MHz or more). The DL slot 404d may correspond to a slot 202 of FIG. 2. The DL slot 404d may include a DL control portion 432, a DL data portion 434, and a UL control portion 436. Each portion 432, 434, 436 may include time-frequency resources, for example, a number of symbols 206 in time and a number of REs 212 or RBs 210 in frequency as shown in FIG. 2. The BS 105 may transmit DL control information (e.g., PDCCH) in the DL control portion 432. The BS 105 may transmit DL data (e.g., PDSCH) in the DL data portion 434. The BS 105 may schedule a UE 115 to transmit UL control information (e.g., PUCCH including SRS, HARQ ACK/NACKs, and/or channel quality indicator (CQI)) in the UL control portion 436. The UL control portion 436 may be spaced apart from the DL data portion 434 by a gap period 406 to provide time for switching between UL and DL. The BS 105 may transmit the SSB 410a in resources within the DL data portion 434. In some aspects, an SSB 410 may include about 20 RBs in frequency and about 4 symbols to 6 symbols in time. In some aspects, the SSB 410 may be located at a centered band of the DL band 420. In some aspects, the SSB 410 may be located at a lower frequency portion of the DL band 420. In some aspects, the SSB 410 may be located at a higher frequency portion of the DL band 420. In generally, the BS 105 may configure the SSB 410 to be at any suitable frequency in the DL band 420.

When the BS 105 utilizes a combination of DL slots, UL slots, and/or full-duplex slots, the BS 105 may dynamically or semi-statically reconfigure a slot to switch among any of the DL, UL, and/or full-duplex mode. In other words, the BS 105 may utilize the channel frequency BW similar to a TDD mode, but may additionally configure some slots to be full-duplex slots. For instance, the BS 105 may initially configure a slot to be a DL slot and may subsequently reconfigure the slot to be a full-duplex slot, for example, to satisfy a latency criteria of a certain UL URLLC communication. As an example, the BS 105 may transmit the SSB 410b in a full-duplex slot 404f as shown in the expanded view 409. The DL slot 404d may include a UL band 424 (e.g., a UL frequency portion) located between an upper DL band 422a (e.g., a DL frequency portion) and a lower DL band 422b (e.g., another DL frequency portion) within the channel frequency BW. The UL band 424 may be spaced apart from the upper DL band 422a by a guard band 423 and may be spaced apart from the lower DL band 422b by another guard band 423. The guard bands 423 may be significantly narrower than the UL band 424 and the DL bands 422. In some instances, a guard band 423 may include about 5 RBs. Each of the DL band 422a, 422b, and the UL band 424 may include any suitable BW. In an example, the BW for each of the DL band 422a, 422b, and the UL band 424 can be predetermined. In another example, the BS 105 may determine the BW for each of the DL band 422a, 422b, and the UL band 424 based on traffic loading and/or latency requirements. The full-duplex slot 404f may correspond to a slot 202 of FIG. 2. In general, a full-duplex slot may include any suitable number of UL frequency portions (e.g., 1, 2, 3 or more) and any suitable number of DL frequency portions (e.g., 1, 2, 3 or more) arranged in any suitable configuration.

The full-duplex slot 404f may include a DL control portion 432 (a time portion) and a DL data portion 434 (a time portion) in each of the DL bands 422a and 422b. The full-duplex slot 404f may include a UL data portion 438 (a time portion) and a UL control portion 436 (a time portion) in the UL band 424. Similar to the portions 432, 434, 436, the UL data portion 438 may include time-frequency resources, for example, a number of symbols 206 in time and a number of REs 212 or RBs 210 in frequency as shown in FIG. 2. The BS 105 may schedule a UE 115 to transmit UL data (e.g., PUSCH) in the UL data portion 438. In some instances, the full-duplex slot 404f may be followed by a UL slot 404u as shown in the expanded view 409. The UL slot 404u may include a UL band in the channel frequency BW and may include a UL data portion 438 followed by a UL control portion 436. In some other instances, the full-duplex slot 404f may be followed by a DL slot similar to the DL slot 404d. In general, a full-duplex slot 404f can be adjacent to a UL slot 404u and/or a DL slot 404d.

Depending on the SSB resource allocation or schedule, an SSB 410 as scheduled can overlap at least partially with a UL band in a full-duplex slot 404f. As shown in the expanded view 409, the SSB 410b as scheduled falls within the full-duplex slot 404f and overlaps with a portion of the UL band 424. That is, at least one resource (e.g., including one or more subcarriers in frequency and one or more symbols in time) configured or scheduled for the SSB 410b may at least partially overlap with the UL band 424 in time and/or frequency. When the scheduled SSB 410b overlaps with the UL band 424, the SSB 410b can interfere with UL transmissions (e.g., UL data) in the UL band 424.

In some aspects, the BS 105 may proceed to transmit the SSB 410b as scheduled regardless of the SSB 410b overlapping with a portion of the UL band 424. For instance, the BS 105 may transmit a first portion of the SSB 410b in a first set of RBs within the DL band 422a and transmit a second proportion of the SSB 410b in a second set of RBs within the UL band 424. The first set of RBs in the DL band 422a and the second set of RBs in the UL band 424 may be as scheduled by the SSB schedule.

In some aspects, the BS 105 may schedule a UE 115 with an UL allocation in the UL band 424 of the full-duplex slot 404f. If the UE 115 determines that a preconfigured SSB transmission schedule is at least partially overlapping with the UL allocation, the UE 115 disregard the UL allocation and refrain from transmitting an UL communication (e.g., UL data) in the UL allocation. In some other instances, the UE 115 may proceed with transmitting an UL communication (e.g., UL data) in the allocation, but may puncture a portion of the UL communication overlapping with the SSB 410b or rate-match around the SSB 410b to avoid interfering with the SSB 410b.

Figure 5:
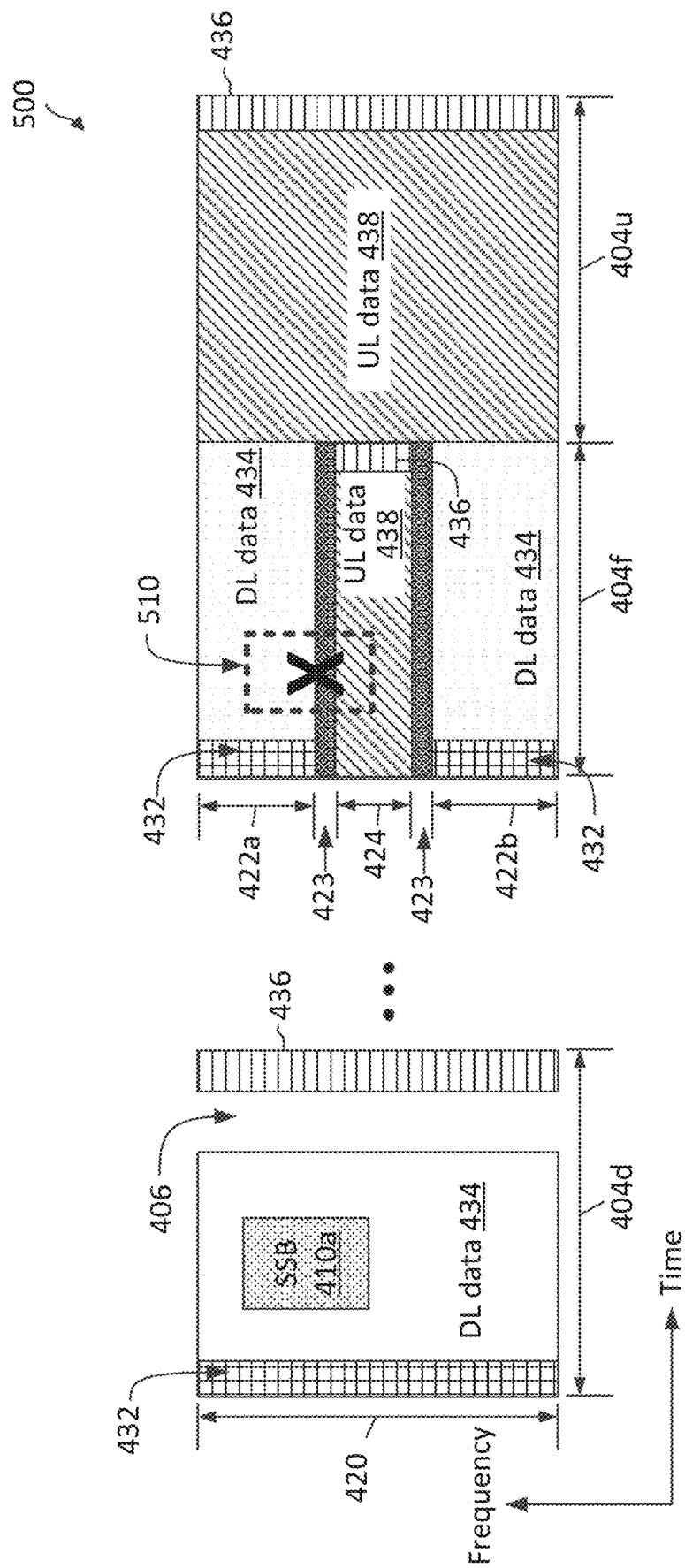
FIG. 5 illustrates an SSB communication method supporting full-duplex communication according to some aspects of the present disclosure.

FIG. 5 illustrates an SSB communication method 500 supporting full-duplex communication according to some aspects of the present disclosure. The method 500 may be employed by a BS 105 and a UE 115 in a network such as the network 100 for communications. In FIG. 5, the x-axis represents time in some arbitrary units, and the y-axis represents frequency in some arbitrary units. The method 500 is described using the same SSB transmission schedule as discussed above in relation to FIG. 4 and may use the same reference numerals as FIG. 4 for simplicity's sake.

In the method 500, when an SSB falls in a full-duplex slot and a current SSB configuration or SSB schedule has an overlap with a UL band in the full-duplex slot, a BS 105 may mute the transmission of the SSB in the full-duplex slot. In other words, the BS 105 may refrain from transmitting an SSB in a full-duplex slot when determining that an SSB transmission schedule is at least partially overlapping with an UL band in the full-duplex slot. Accordingly, a UE 115 may assume the SSB in the full-duplex slot is muted and refrain from receiving or decoding an SSB from the full-duplex slot. If the UE 115 is scheduled with an UL allocation in the full-duplex slot, the UE may proceed to transmit an UL transmission (e.g., PUSCH) to the BS according to the UL allocation.

In the illustrated example of FIG. 5, the SSB 410b as scheduled overlaps with a portion of the UL band 424 in the full-duplex slot 404f. The SSB 410b is muted based on the SSB 410b being partially overlapping with the UL band 424 in the full-duplex slot 404f. The BS 105 may not transmit the SSB 410b in the full-duplex slot 404f as shown by the dashed outlined box 510 with the cross symbol "X". In some aspects, the BS 105 may configure the UE 115 with an SSB muting pattern where one or more of the prescheduled SSBs can be muted (e.g., no transmission). In some aspects, the BS 105 may configure the UE 115 with an explicit configuration to mute the transmission of the SSB 410b in the full-duplex slot 404f. In some instances, the configuration can be substantially similar to the ssb-PositionsInBurst information element as discussed above in relation to FIG. 4. In some other aspects, the muting of the SSB 410b transmission in the full-duplex slot 404f can be implicit, for example, based on a predetermined configuration or a wireless communication standard such as the 3GPP standard.

Figure 6:
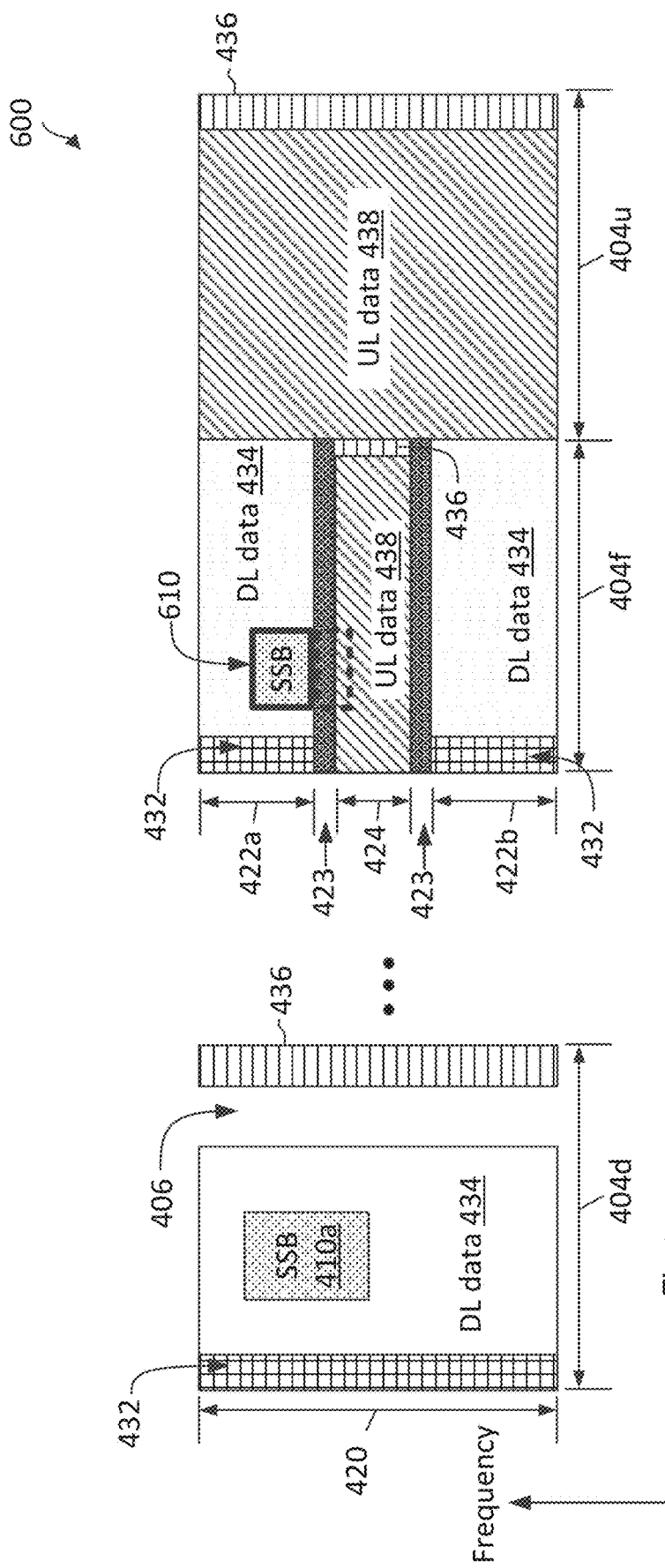
FIG. 6 illustrates an SSB communication method supporting full-duplex communication according to some aspects of the present disclosure

FIG. 6 illustrates an SSB communication method 600 supporting full-duplex communication according to some aspects of the present disclosure. The method 600 may be employed by a BS 105 and a UE 115 in a network such as the network 100 for communications. In FIG. 6, the x-axis represents time in some arbitrary units, and the y-axis represents frequency in some arbitrary units. The method 600 is described using the same SSB transmission schedule as discussed above in relation to FIG. 4 and may use the same reference numerals as FIG. 4 for simplicity's sake.

In the method 600, when an SSB falls in a full-duplex slot and a current SSB configuration or SSB schedule has an overlap with a UL band in the full-duplex slot, a BS 105 may transmit an SSB in a full-duplex slot by puncturing a portion of the SSB overlapping with a UL band in the full-duplex slot. Accordingly, a UE 115 may assume the portion of the SSB overlapping with the UL band is punctured. If the UE 115 is scheduled with an UL allocation in the full-duplex slot, the UE may proceed to transmit an UL transmission (e.g., PUSCH) to the BS according to the UL allocation.

In the illustrated example of FIG. 6, the SSB 410b as scheduled overlaps with a portion of the UL band 424. The BS 105 may map coded bits of the SSB to time-frequency resources (e.g., RBs 210) as scheduled. The BS 105 may drop the transmission of the portion of the coded bits that are mapped to time-frequency resources that are within the guard band 423 and the UL band 424. As shown, the BS 105 transmits a first portion of the SSB 410b (shown by the reference numeral 610) according to the preconfigured SSB transmission schedule and refrain from transmitting a second portion of the SSB 410b overlapping with the UL band 424 (shown by the empty dashed outlined box).

Figure 7:
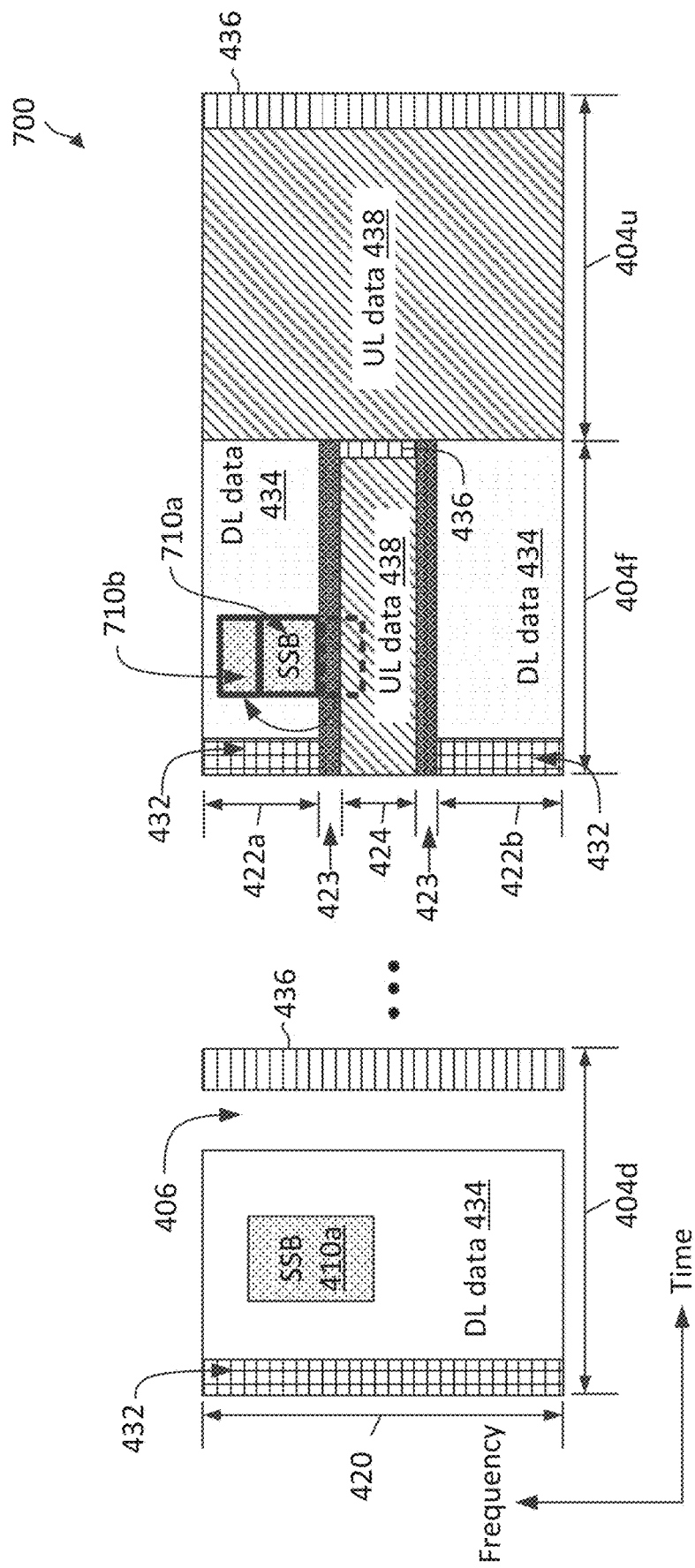
FIG. 7 illustrates an SSB communication method supporting full-duplex communication according to some aspects of the present disclosure

FIG. 7 illustrates an SSB communication method 700 supporting full-duplex communication according to some aspects of the present disclosure. The method 700 may be employed by a BS 105 and a UE 115 in a network such as the network 100 for communications. In FIG. 7, the x-axis represents time in some arbitrary units, and the y-axis represents frequency in some arbitrary units. The method 700 is described using the same SSB transmission schedule as discussed above in relation to FIG. 4 and may use the same reference numerals as FIG. 4 for simplicity's sake.

The method 700 may be substantially similar to the method 600. For instance, when an SSB falls in a full-duplex slot and a current SSB configuration or SSB schedule has an overlap with a UL band in the full-duplex slot, a BS 105 may transmit an SSB in a full-duplex slot by puncturing a portion of the SSB overlapping with a UL band in the full-duplex slot. The BS 105 may additionally transmit the punctured portion in resources (e.g., RBs 210) directly above the scheduled SSB. Accordingly, a UE 115 may assume the portion of the SSB overlapping with the UL band is punctured and transmitted in RBs directly above the original SSB allocation. If the UE 115 is scheduled with an UL allocation in the full-duplex slot, the UE may proceed to transmit an UL transmission (e.g., PUSCH) to the BS according to the UL allocation.

In the illustrated example of FIG. 7, the SSB 410b as scheduled overlaps with a portion of the UL band 424. The BS 105 may map coded bits of the SSB to time-frequency resources (e.g., RBs 210) as scheduled. The BS 105 may drop the transmission of the portion of the coded bits that are mapped to time-frequency resources that are within the guard band 423 and the UL band and transmit the punctured portion in the DL band 422a. As shown, the BS 105 transmits a first portion of the SSB 410b (shown by the reference numeral 710a) in a first resource (e.g., RBs 210) within the DL band 422a according to the preconfigured SSB transmission schedule, punctures a second portion of the SSB 410b overlapping with the UL band 424 (shown by the empty dashed outlined box), and transmit the second portion of the SSB 410b in a second resource (e.g., RBs 210) in the DL band 422a (shown by the reference numeral 710b). The second resource may be adjacent to the first resource in frequency and at a higher frequency than the first resource. For example, the second resource may include RB(s) in the same symbol(s) (e.g., the symbols 206) as the first resource and directly above the first resource in frequency. The configuration of the second resource to be adjacent and directly above the first resource may allow a UE 115 to monitor and receive the SSB from contiguous frequency resources.

Figure 8:
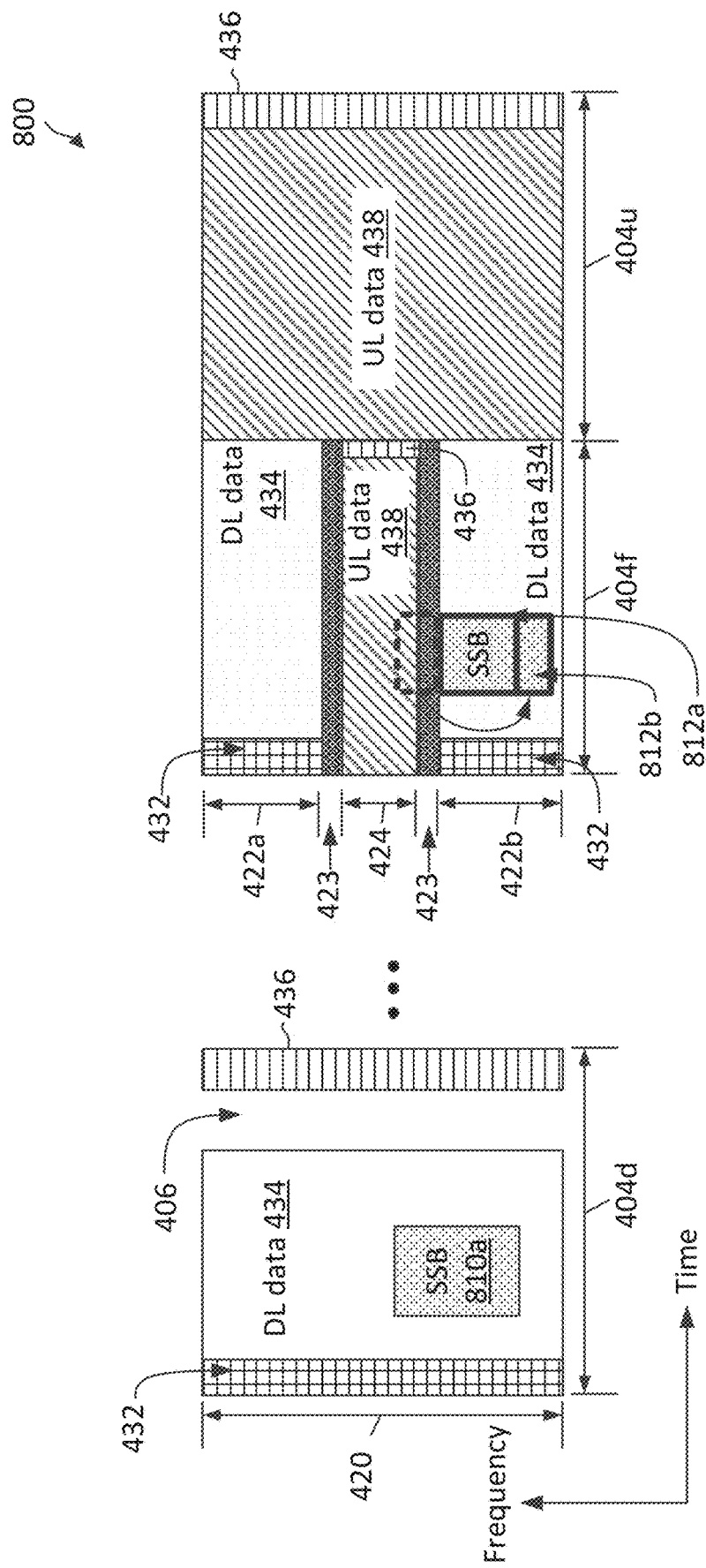
FIG. 8 illustrates an SSB communication method supporting full-duplex communication according to some aspects of the present disclosure

FIG. 8 illustrates an SSB communication method 800 supporting full-duplex communication according to some aspects of the present disclosure. The method 800 may be employed by a BS 105 and a UE 115 in a network such as the network 100 for communications. In FIG. 8, the x-axis represents time in some arbitrary units, and the y-axis represents frequency in some arbitrary units. The method 800 is described using a similar SSB transmission schedule as discussed above in relation to FIG. 4 and may use the same reference numerals as FIG. 4 for simplicity's sake.

The method 800 is similar to the method 700. However, the preconfigured SSB allocation is in the DL band 422b and overlaps with a lower frequency portion of the UL band 424 instead of in the DL band 422a and overlaps with a higher frequency portion of the UL band 424. In the illustrated example of FIG. 8, the BS 105 may schedule SSBs 810 in a lower frequency portion of a channel frequency BW. As shown the BS 105 may transmit an SSB 810a in a lower frequency portion of the DL band 420 in the DL slot 404d. When the SSB transmission schedule falls within the full-duplex slot 404f, the BS 105 transmits a first portion of an SSB 810 (shown by the reference numeral 812a) in a first resource (e.g., RBs 210) within the DL band 422b according to the preconfigured SSB transmission schedule, punctures a second portion of the SSB 810 overlapping with the UL band 424 (shown by the empty dashed outlined box), and transmit the second portion of the SSB 810 in a second resource (e.g., RBs 210) in the DL band 422b (shown by the reference numeral 812b). The second resource may be adjacent to the first resource in frequency and at a lower frequency than the first resource. For example, the second resource may include RB(s) in the same symbol(s) (e.g., the symbols 206) as the first resource and directly below the first resource. The configuration of the second resource to be adjacent and directly below the first resource may allow a UE 115 to monitor and receive the SSB from contiguous frequency resources. If the UE 115 is scheduled with an UL allocation in the full-duplex slot, the UE may proceed to transmit an UL transmission (e.g., PUSCH) to the BS according to the UL allocation.

Figure 9:
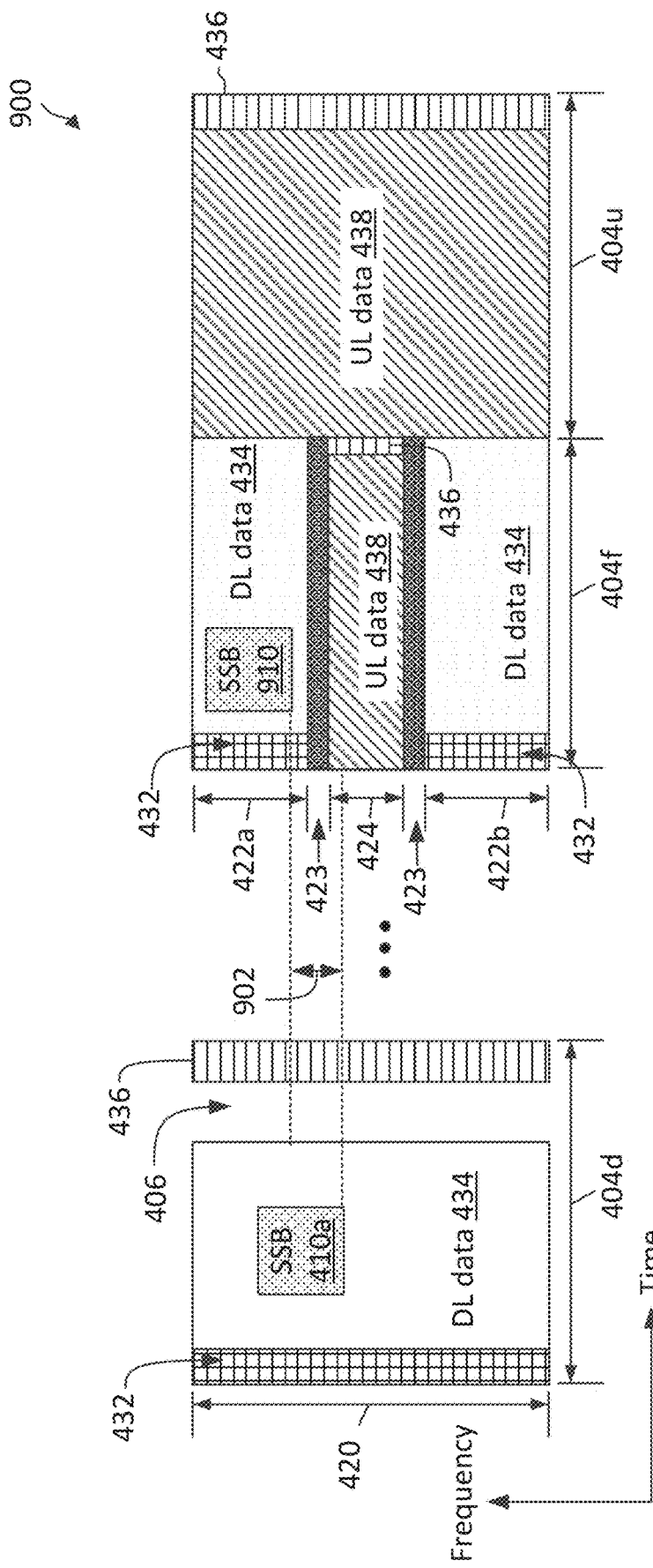
FIG. 9 illustrates an SSB communication method supporting full-duplex communication according to some aspects of the present disclosure

FIG. 9 illustrates an SSB communication method 900 supporting full-duplex communication according to some aspects of the present disclosure. The method 900 may be employed by a BS 105 and a UE 115 in a network such as the network 100 for communications. In FIG. 9, the x-axis represents time in some arbitrary units, and the y-axis represents frequency in some arbitrary units. The method 900 is described using the same SSB transmission schedule as discussed above in relation to FIG. 4 and may use the same reference numerals as FIG. 4 for simplicity's sake.

In the method 900, when an SSB falls in a full-duplex slot and a current SSB configuration or SSB schedule has an overlap with a UL band in the full-duplex slot, a BS 105 may apply a frequency-shift to the SSB transmission such that the entire SSB may be transmitted within a DL band in the full-duplex slot. Accordingly, a UE 115 may assume a frequency-shift of the SSB in the full-duplex slot. If the UE 115 is scheduled with an UL allocation in the full-duplex slot, the UE may proceed to transmit an UL transmission (e.g., PUSCH) to the BS according to the UL allocation.

In the illustrated example of FIG. 9, the SSB 410b as scheduled overlaps with a portion of the UL band 424. The BS 105 may apply a frequency-shift 902 to a preconfigured SSB transmission schedule such that the entire SSB 410b can be transmitted within the DL band 422a. The frequency-shifted SSB transmission is shown by reference numeral 910.

In some aspects, the amount of frequency-shift 902 can be predetermined. In some aspects, a predetermined configuration may configure a frequency-shift such that a frequency-shifted SSB 910 is aligned to a lowest frequency edge of a DL band 422a where the SSB is initially scheduled or preconfigured. For instance, the BS 105 may transmit the SSB 910 in a set of RBs (e.g., the RBs 210) within the DL band 422a in symbols as originally scheduled or preconfigured, where the set of RBs may include a lowest-frequency RB in the DL band 422a. In some aspects, a predetermined configuration may configure a frequency-shift such that a frequency-shifted SSB 910 may be aligned to a highest frequency edge of a DL band 422a where the SSB is initially scheduled or preconfigured. For instance, the BS 105 may transmit the SSB 910 in a set of RBs (e.g., the RBs 210) within the DL band 422a in symbols as originally scheduled or preconfigured, where the set of RBs may include a highest-frequency RB in the DL band 422a. Although FIG. 9 illustrates a preconfigured SSB schedule falls within the DL band 422a and overlapping with a high frequency portion the UL band 424 in the full-duplex slot 404f, it should be understood that in other examples the preconfigured SSB schedule can fall within the DL band 422b and overlapping with a low frequency portion of the UL band 424 in the full-duplex slot 404f (e.g., as shown in FIG. 8). When the preconfigured SSB schedule falls within the DL band 422b and overlapping with a low frequency portion of the UL band 424 in the full-duplex slot 404f, the BS 105 may utilize similar mechanisms to frequency-shift the SSB such that the frequency-shifted SSB may be aligned to a lowest frequency edge or a highest frequency edge of the DL band 422b. In general, the predetermined configuration may indicate a fixed frequency-shift 902 or a fixed number of RBs for shifting an SSB up or down within any DL band (e.g., the DL band 422a or the DL band 422b) in a full-duplex slot 404f.

In some aspects, the amount of frequency-shift 902 can be configurable. For instance, the BS 105 may configure a UE 115 with a configuration for frequency-shifting an SSB transmission schedule when the SSB transmission schedule falls within a full-duplex slot 404f and overlaps with a UL band 424 in the full-duplex slot 404f. In some instances, the configuration may indicate one of four frequency-shifts, which may be indicated by using 2 bits. For example, a first indication (e.g., b00) may indicate a frequency-shift such that the frequency-shifted SSB is aligned to a highest frequency edge of the DL band 422a. A second indication (e.g., b01) may indicate a frequency-shift such that the frequency-shifted SSB is aligned to a lowest frequency edge of the DL band 422a. A third indication (e.g., b10) may indicate a frequency-shift such that the frequency-shifted SSB is aligned to a highest frequency edge of the DL band 422b. A fourth indication (e.g., b11) may indicate a frequency-shift such that the frequency-shifted SSB 910 is aligned to a lowest frequency edge of the DL band 422b. In some other instances, the configuration may indicate a number of one or more RBs (e.g., RBs 210) or one or more REs (e.g., the REs 212) for the frequency-shift 902 and a direction for the frequency-shift 902. The direction for the frequency-shift 902 may be a frequency-up-shift or a frequency-down-shift, which may be indicated using one bit. For instance, the configuration may indicate a frequency-shift of two RBs and an up direction for shifting an SSB two RBs above a preconfigured SSB allocation. In some instances, the number of RBs and/or the direction for frequency-shifting an SSB may be dependent on a preconfigured SSB allocation, a BW and a location of the UL band 424 within the full-duplex slot 404f. In some aspects, the BS 105 may transmit the SSB frequency-shift configuration via an RRC configuration. In some other aspects, the BS 105 may transmit the SSB frequency-shift configuration dynamically via DCI in a PDCCH.

In some aspects, a BS 105 may configure a full-duplex slot (e.g., the full-duplex slot 404l) with a wide UL band (e.g., the UL band 424) and one or more narrow DL bands (e.g., the DL bands 422a and 422b). For instance, the BS 105 may receive a UL URLLC transmission request, and thus may reconfigure a slot as a full-duplex slot with a wider UL band than DL bands.

In some aspects, when a full-duplex slot does not include any DL band that is wide enough to accommodate the transmission of the entire SSB (e.g., the SSBs 410), the BS 105 may skip the SSB transmission in the full-duplex slot. In other words, when an SSB falls within a full-duplex slot including DL bands where each DL band has a smaller BW than a BW of an SSB (e.g., the SSBs 410), the BS 105 may refrain from transmitting an SSB in the full-duplex slot according to the preconfigured SSB schedule. In some instances, an SSB may be transmitted in about 20 RBs (e.g., the RBs 210). Thus, of a full-duplex slot does not include any DL band having 20 RBs or more, the BS 105 may refrain from transmitting an SSB in the full-duplex slot.

In some aspects, the BS 105 may avoid configuring a full-duplex slot with no DL band that can accommodate a transmission of an entire SSB. If the BS 105 does indicate a slot configuration for a full-duplex slot with no DL band that can accommodate a transmission of an entire SSB, a UE 115 may assume that the BS 105 has a configuration error.

In some aspects, when a full-duplex slot does not include any DL band that include a BW wide enough to accommodate the transmission of an entire SSB, the BS 105 may continue with transmitting the SSB as scheduled. In other words, the SSB may overlap with at least a portion of a UL band in the full-duplex slot.

Figure 10:
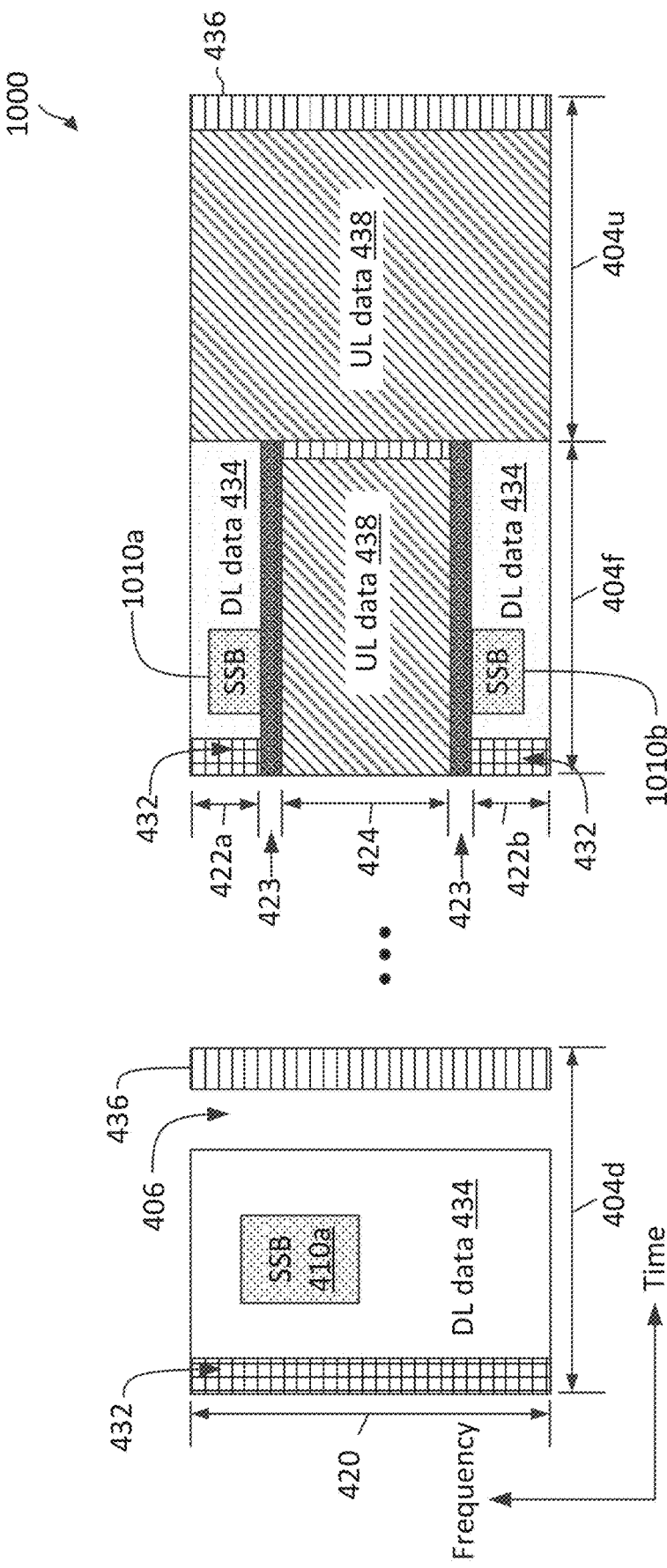
FIG. 10 illustrates an SSB communication method supporting full-duplex communication according to some aspects of the present disclosure

In some aspects, when a full-duplex slot does not include any DL band that include a BW wide enough to accommodate the transmission of the entire SSB, the BS 105 may split an SSB into multiple parts and transmit each part within a DL band as shown in FIG. 10.

FIG. 10 illustrates an SSB communication method 1000 supporting full-duplex communication according to some aspects of the present disclosure. The method 1000 may be employed by a BS 105 and a UE 115 in a network such as the network 100 for communications. In FIG. 10, the x-axis represents time in some arbitrary units, and the y-axis represents frequency in some arbitrary units. The method 1000 is described using the same SSB transmission schedule as discussed above in relation to FIG. 4 and may use the same reference numerals as FIG. 4 for simplicity's sake.

In the method 1000, when an SSB falls in a full-duplex slot and the full-duplex slot does not include a DL band that can accommodate the transmission of an entire SSB, a BS 105 may partition the SSB into multiple portions and transmit each portion in a DL band within the full-duplex slot.

In the illustrated example of FIG. 10, the BS 105 configures a wide UL band 424 between two narrow DL bands 422a and 422b within a channel frequency BW in a full-duplex slot 404f. Each of the DL bands 422a and 422b may have a BW less than a BW of the SSB 410. For instance, the SSB 410 may occupy about 20 RBs (e.g., the RBs 210) and each of the DL bands 422a and 422b includes less than 20 RBs. When an SSB 410b as scheduled falls within the full-duplex slot 404f, the BS 105 partitions the SSB 410b into a portion 1010a and a portion 1010b, where each portion 1010a and 1010b may be transmitted within DL band 422a or DL band 422b. For instance, the BS 105 may transmit the portion 1010a in a first set of RBs in the DL band 422a (above the UL band 424) and the portion 1010b in a second set of RBs in the DL band 422b (below the UL band 424). In some aspects, the first set of RBs in the DL band may be aligned to a lowest frequency edge of the DL band 422a and the second set of RBs in the DL band 422b may be aligned to highest frequency edge of the DL band 422b. For example, the first set of RBs may include a lowest-frequency RB in the DL band 422a, and the second set of RBs may include a highest-frequency RB in the DL band 422b. In some other aspects, the first set of RBs may include a highest-frequency RB in the DL band 422a, and the second set of RBs may include a lowest-frequency RB in the DL band 422b. In general, the BS 105 may transmit the portions 1010a and 1010b of the SSB in any suitable time and/or frequency location within the DL band 422a and/or the DL band 422b.

In some aspects, the BS 105 may configure a UE 115 with a configuration for splitting a prescheduled or preconfigured SSB transmission schedule at least partially overlapping with a UL band 424 in a full-duplex slot 404f. Although FIG. 10 illustrates the BS 105 splitting an SSB 410b into two portions, it should be understood that in other examples the BS 105 may split an SSB 410b into any suitable number of portions. For instance, the configuration may indicate a number of portions that an SSB 410b may be partitioned into and the location where the splitting may occur.

The configuration may also indicate a number of one or more RBs in each SSB portion and a frequency location where the portion may be transmitted.

For instance, the SSB 410b may occupy 20 RBs and the configuration may indicate that the SSB 410b is split into two portions 1010a and 1010b, where the splitting point may be at the 11-th RB within the SSB allocation. The configuration may configure the portion 1010a is to be transmitted in the DL band 422a between RB index k to RB index k+10 and the portion 1010b is to be transmitted in the DL band 422b between RB index m to RB index m+10. In some other instances, the configuration may indicate a fixed allocation for each SSB portion. For instance, the configuration may indicate whether the allocation for an SSB portion is aligned to or coincides with a highest-frequency RB or a lowest-frequency RB in a DL band 422a or a DL band 422b. Alternatively, the configuration may indicate a frequency-shift or offset from a highest-frequency RB or from a lowest-frequency RB in a DL band 422a or 422b. In some aspects, the BS 105 may transmit the SSB splitting configuration via an RRC configuration. In some other aspects, the BS 105 may transmit the SSB splitting configuration dynamically via DCI in a PDCCH.

Figure 11:
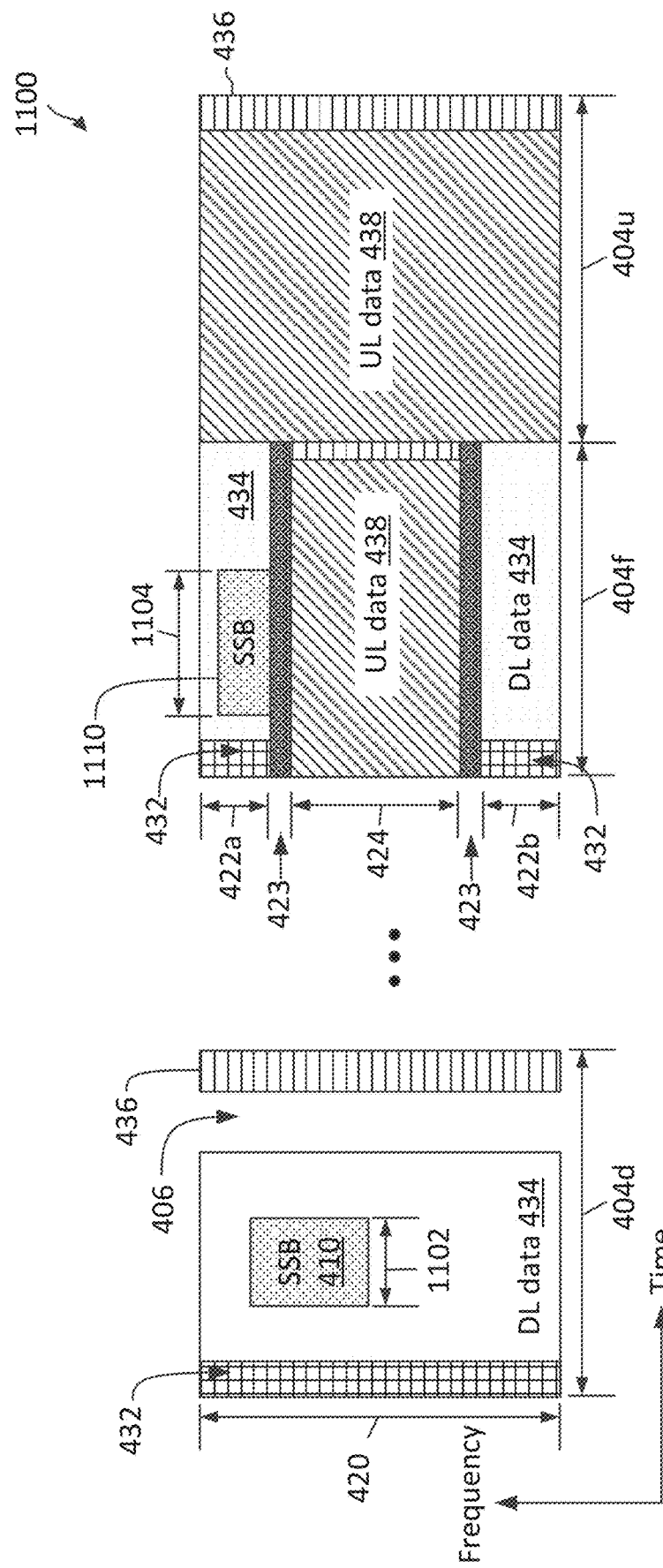
FIG. 11 illustrates an SSB communication method supporting full-duplex communication according to some aspects of the present disclosure

FIG. 11 illustrates an SSB communication method 1100 supporting full-duplex communication according to some aspects of the present disclosure. The method 1100 may be employed by a BS 105 and a UE 115 in a network such as the network 100 for communications. In FIG. 11, the x-axis represents time in some arbitrary units, and the y-axis represents frequency in some arbitrary units. The method 1100 is described using the same SSB transmission schedule as discussed above in relation to FIG. 4 and may use the same reference numerals as FIG. 4 for simplicity's sake.

In the method 1100, when an SSB falls in a full-duplex slot and the full-duplex slot does not include a DL band that can accommodate the transmission of an entire SSB, a BS 105 may transmit an SSB within a DL band using a greater number of symbols (e.g., the symbols 206) than the number of symbols as scheduled.

In the illustrated example of FIG. 11, the BS 105 may configure a wide UL band 424 between two narrow DL bands 422a and 422b within a channel frequency BW in a full-duplex slot 404f similar to the example shown in FIG. 10. When an SSB 410b as scheduled falls within the full-duplex slot 404f, the BS 105 transmits the SSB 410b (shown as 1110) in an extended duration 1104 such that the entire SSB 410b can be transmitted within the DL band 422a. For instance, the preconfigured SSB schedule may configure 6 symbols for the SSB 410 transmission. In the full-duplex slot 404f, the BS 105 may extend the transmission time of the SSB 1110 to more than 6 symbols (e.g., about 7, 8, 9 or more symbols). The duration of the extended duration 1104 may depend on the BW of the DL band 422a and the size of the SSB 410b.

Figure 12:
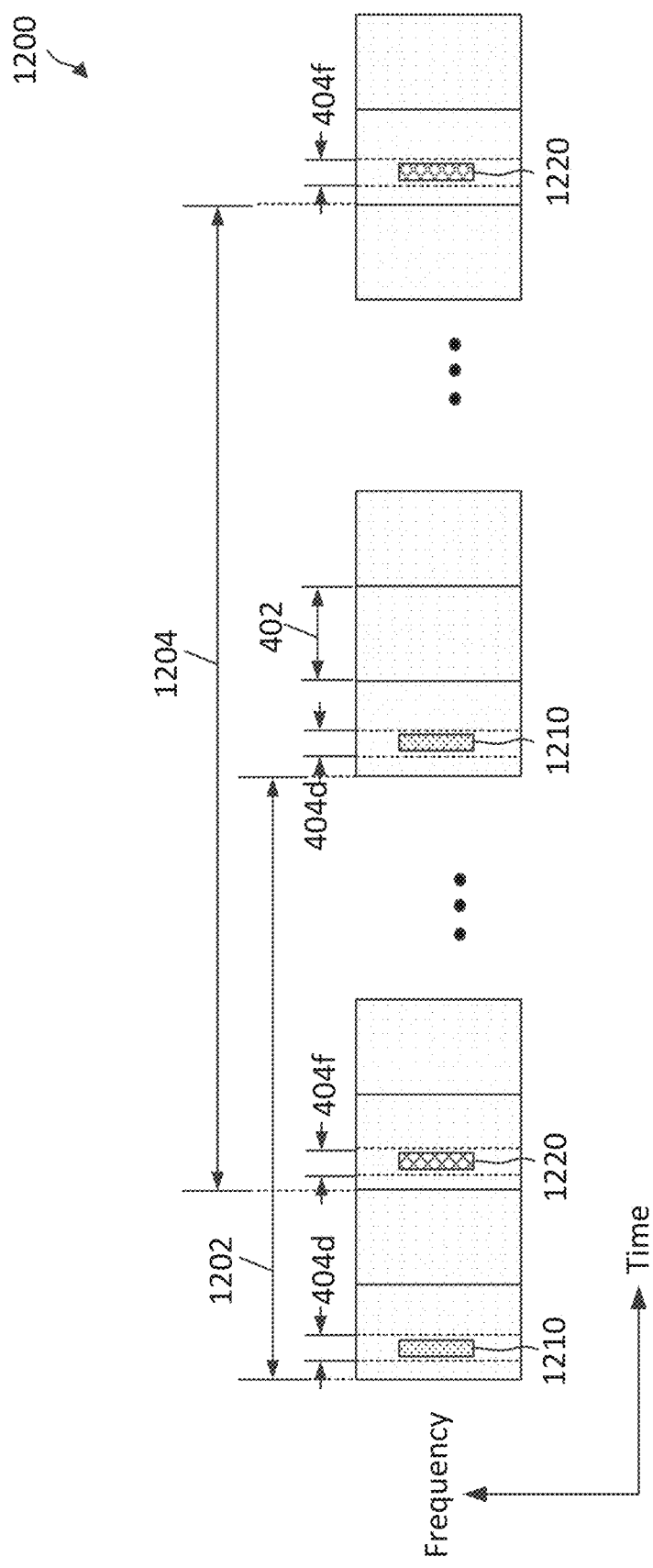
FIG. 12 illustrates an SSB communication method supporting full-duplex communication according to some aspects of the present disclosure

FIG. 12 illustrates an SSB communication method 1200 supporting full-duplex communication according to some aspects of the present disclosure. The method 1200 may be employed by a BS 105 and a UE 115 in a network such as the network 100 for communications. In FIG. 12, the x-axis represents time in some arbitrary units, and the y-axis represents frequency in some arbitrary units. The method 1200 is described using the same SSB transmission schedule as discussed above in relation to FIG. 4 and may use the same reference numerals as FIG. 4 for simplicity's sake.

In the method 1200, a BS 105 may configure two sets of SSBs with two different periodicities. For instance, the BS 105 may configure a first set of SSBs 1210 with a periodicity of 1202 to be transmitted in DL slots 404d. Additionally, the BS 105 may configure a second set of SSBs 1220 with a periodicity of 1204 to be transmitted in full-duplex slots 404f. The first set of SSBs 1210 and the second set of SSBs 1220 may be similar to the SSBs 410. For instance, each SSB 1210 and 1220 may including a PSS 412, a SSS 414, and a PBCH 1416 as shown in FIG. 4. The BS 105 may transmit the first of SSBs 1210 in a DL band (e.g., the DL band 420) of the DL slot 404d, for example, similar to the SSB 410 shown in FIG. 4. The BS 105 may transmit the second set of SSBs 1220 using any of the method 500-1100 discussed above in relation to FIGS. 5-11.

In general, a BS 105 may communicate SSBs with a UE 115 in a full-duplex slot 404f using any suitable combination of the methods 600-1200 discussed above with reference to FIGS. 6-12. In general, the BS 105 may perform SSB transmission in a full-duplex slot 404f by excluding SSB transmission in the guard bands 423 and the UL band 424 of the full-duplex slot 404f, and a UE 115 performing SSB reception in a full-duplex slot 404 may exclude SSB reception in the guard bands 423 and the UL band 424 of the full-duplex slot 404f.

Figure 13:
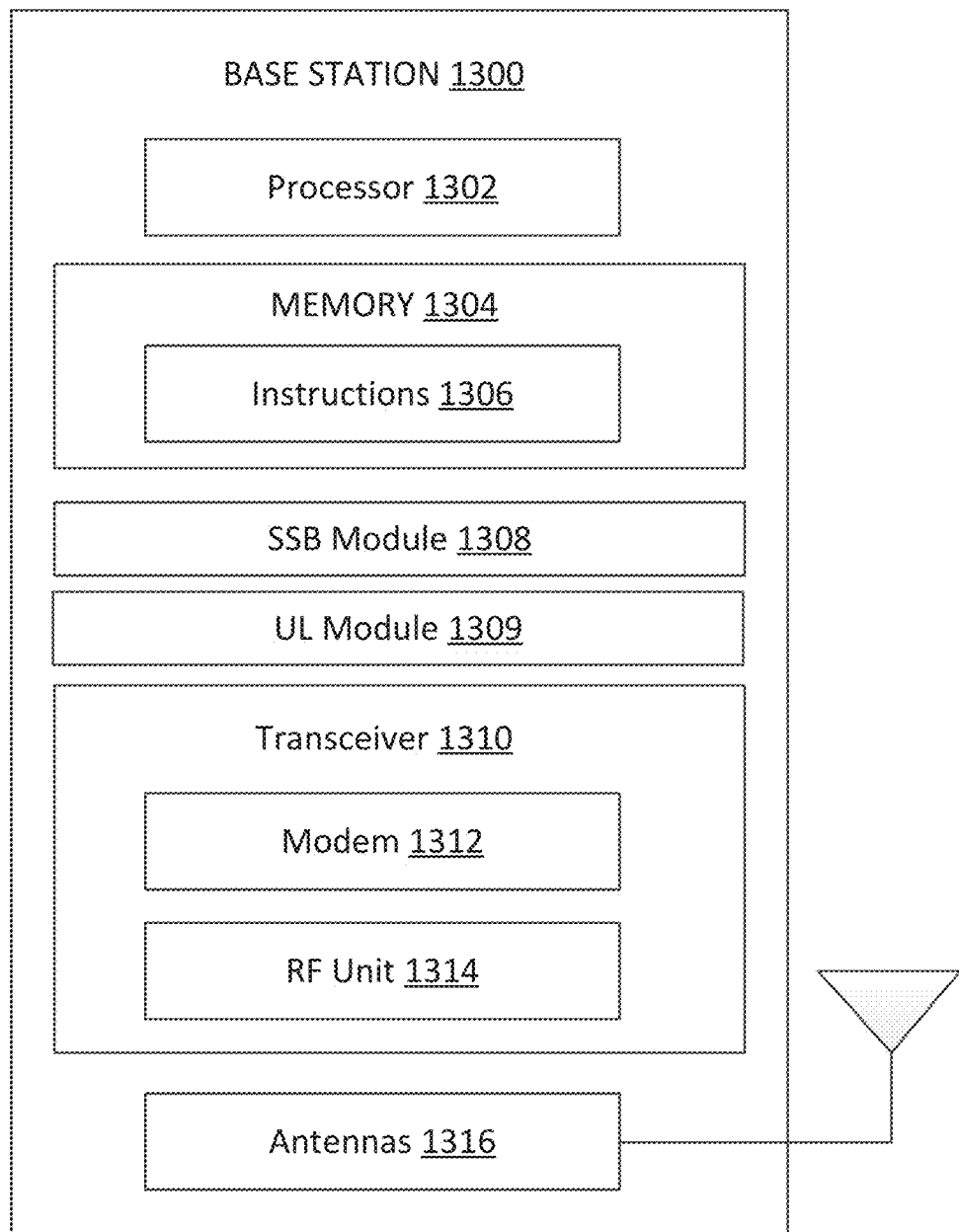
FIG. 13 is a block diagram of an exemplary base station (BS) according to some aspects of the present disclosure.

FIG. 13 is a block diagram of an exemplary BS 1300 according to some aspects of the present disclosure. The BS 1300 may be a BS 105 in the network 100 as discussed above in FIG. 1. As shown, the BS 1300 may include a processor 1302, a memory 1304, an SSB module 1308, an UL module 1309, a transceiver 1310 including a modem subsystem 1312 and a RF unit 1314, and one or more antennas 1316. These elements may be coupled with one another. The term "coupled" may refer to directly or indirectly coupled or connected to one or more intervening elements. For instance, these elements may be in direct or indirect communication with each other, for example via one or more buses.

The processor 1302 may have various features as a specific-type processor. For example, these may include a CPU, a DSP, an ASIC, a controller, a FPGA device, another hardware device, a firmware device, or any combination thereof configured to perform the operations described herein. The processor 1302 may also be implemented as a combination of computing devices, e.g., a combination of a DSP and a microprocessor, a plurality of microprocessors, one or more microprocessors in conjunction with a DSP core, or any other such configuration.

The memory 1304 may include a cache memory (e.g., a cache memory of the processor 1302), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 1304 may include a non-transitory computer-readable medium. The memory 1304 may store instructions 1306. The instructions 1306 may include instructions that, when executed by the processor 1302, cause the processor 1302 to perform operations described herein, for example, aspects of FIGS. 2, 3A, 3B, 3C, and 4-12. Instructions 1306 may also be referred to as program code. The program code may be for causing a wireless communication device to perform these operations, for example by causing one or more processors (such as processor 1302) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

Each of the SSB module 1308 and the UL module 1309 may be implemented via hardware, software, or combinations thereof. For example, each of the SSB module 1308 and the UL module 1309 may be implemented as a processor, circuit, and/or instructions 1306 stored in the memory 1304 and executed by the processor 1302. In some examples, the SSB module 1308 and the UL module 1309 can be integrated within the modem subsystem 1312. For example, the SSB module 1308 and the UL module 1309 can be implemented by a combination of software components (e.g., executed by a DSP or a general processor) and hardware components (e.g., logic gates and circuitry) within the modem subsystem 1312. In some examples, a BS may include one of the SSB module 1308 and the UL module 1309. In other examples, a BS may include both the SSB module 1308 and the UL module 1309.

The SSB module 1308 and the UL module 1309 may be used for various aspects of the present disclosure, for example, aspects of FIGS. 2, 3A, 3B, 3C, and 4-12. The SSB module 1308 is configured to preconfigure an SSB transmission schedule, configure DL slots, UL slots, and full-duplex slots in a channel frequency band (e.g., in an unpaired spectrum band), determine whether the preconfigured SSB transmission schedule is at least partially overlapping with the UL band in a first full-duplex slot, and perform SSB transmission by excluding at least the UL band in the first full-duplex slot based on the SSB transmission schedule being at least partially overlapping with the UL band in the first full-duplex slot.

The SSB module 1308 may be configured to exclude the UL band from an SSB transmission in a full-duplex slot using various techniques. In some instances, the SSB module 1308 is configured to mute the SSB transmission in the full-duplex slot, for example, as discussed above with reference to FIG. 5. In some instances, the SSB module 1308 is configured to transmit an SSB in the full-duplex slot by puncturing a portion of the SSB that is overlapping with the UL band, for example, as discussed above with reference to FIG. 6. The SSB module 1308 may also be configured to transmit the punctured portion within a DL band of the full-duplex slot, for example, in a resource adjacent to the preconfigured SSB allocation as discussed above with reference to FIGS. 7 and 8. In some instances, the SSB module 1308 is configured to transmit the SSB in the full-duplex slot by frequency-shifting the SSB such that the SSB may be completely within a DL band in the full-duplex slot, for example, as discussed above with reference to FIG. 9. In some instances, the SSB module 1308 is configured to transmit an SSB in the full-duplex slot by partitioning the SSB into multiple portions such that each portion can be transmitted within a DL band in the full-duplex slot, for example, as discussed above with reference to FIG. 10. In some instances, the SSB module 1308 is configured to transmit the SSB in the full-duplex slot by extending a transmission duration (e.g., using more symbols than as scheduled) such that the SSB may be completely transmitted within a DL band of the full-duplex slot, for example, as discussed above with reference to FIG. 11. In some instances, the SSB module 1308 is configured to transmit a first set of SSBs in DL slots based on a first periodicity and transmit a second set of SSBs in full-duplex slots based on a second periodicity different from the first periodicity, for example, as discussed above with reference to FIG. 12.

In some other aspects, the SSB module 1308 is configured to transmit an SSB in the full-duplex slot regardless of the SSB being overlapping at least a portion of the UL band.

In some aspects, the SSB module 1308 is further configured to transmit a preconfigured SSB transmission schedule, transmit a slot format configuration (e.g., indicating DL slots, UL slots, and/or full-duplex slots), transmit a SSB muting pattern, transmit an SSB frequency-shifting configuration (for shifting an SSB schedule in frequency), transmit an SSB splitting configuration (for splitting an SSB transmission into multiple portions), and/or transmit an SSB transmission extension configuration (for extending transmission duration of an SSB) to facilitate SSB transmissions in full-duplex slots. Each configuration can be transmitted via an RRC configuration or dynamic DCI in a PDCCH. Mechanisms for communicating SSBs with full-duplex communications are described in greater detail herein.

The UL module 1309 is configured to schedule UL allocation for a UE (e.g., the UEs 115) in a UL band of a full-duplex slot and receive a UL transmission from the UE according to the UL allocation. In some aspects, the UL module 1309 is configured to apply at least one of puncturing or rate-match to receive a UL transmission in the full-duplex slot, for example, when the SSB module 1308 is configured to transmit an SSB according to a preconfigured schedule and the SSB overlaps with at least a portion of the UL band.

As shown, the transceiver 1310 may include the modem subsystem 1312 and the RF unit 1314. The transceiver 1310 can be configured to communicate bi-directionally with other devices, such as the UEs 115 and/or another core network element. The modem subsystem 1312 may be configured to modulate and/or encode data according to a MCS, e.g., a LDPC coding scheme, a turbo coding scheme, a convolutional coding scheme, a digital beamforming scheme, etc. The RF unit 1314 may be configured to process (e.g., perform analog to digital conversion or digital to analog conversion, etc.) modulated/encoded data (e.g., RRC configuration, SSB transmission schedule, slot format configuration, slot format reconfiguration, PDCCH DCI, SSBs, SSB muting pattern, SSB frequency-shifting configuration, SSB splitting configuration, UL allocation) from the modem subsystem 1312 (on outbound transmissions) or of transmissions originating from another source such as a UE 115. The RF unit 1314 may be further configured to perform analog beamforming in conjunction with the digital beamforming. Although shown as integrated together in transceiver 1310, the modem subsystem 1312 and/or the RF unit 1314 may be separate devices that are coupled together at the BS 105 to enable the BS 105 to communicate with other devices.

The RF unit 1314 may provide the modulated and/or processed data, e.g. data packets (or, more generally, data messages that may contain one or more data packets and other information), to the antennas 1316 for transmission to one or more other devices. This may include, for example, transmission of information to complete attachment to a network and communication with a camped UE 115 according to some aspects of the present disclosure. The antennas 1316 may further receive data messages transmitted from other devices and provide the received data messages for processing and/or demodulation at the transceiver 1310. The transceiver 1310 may provide the demodulated and decoded data (e.g., PUSCH, PUCCH) to the SSB module 1308 and UL module 1309 for processing. The antennas 1316 may include multiple antennas of similar or different designs in order to sustain multiple transmission links.

In some aspects, the processor 1302 is configured to communicate with other components of the BS 1300 to determine whether an SSB transmission schedule is at least partially overlapping with an UL band in a first full-duplex slot. The transceiver 1310 is configured to communicate with other components of the BS 1300 to perform SSB transmission by excluding at least the UL band in the first full-duplex slot based on the SSB transmission schedule being at least partially overlapping with the UL band in the first full-duplex slot.

In some aspects, the processor 1302 is configured to communicate with other components of the BS 1300 to determine whether an SSB is scheduled in a full-duplex slot and at least partially overlapping with an UL band in the full-duplex slot. The transceiver 1310 is configured to communicate with other components of the BS 1300 to transmit a first portion of the SSB in a DL band in the full-duplex slot. The transceiver 1310 is also configured to transmit a second portion of the SSB in the UL band in the full-duplex slot based on the SSB being scheduled in the full-duplex slot and at least partially overlapping with the UL band in the full-duplex slot.

In an aspect, the BS 1300 can include multiple transceivers 1310 implementing different RATs (e.g., NR and LTE). In an aspect, the BS 1300 can include a single transceiver 1310 implementing multiple RATs (e.g., NR and LTE). In an aspect, the transceiver 1310 can include various components, where different combinations of components can implement different RATs.

Figure 14:
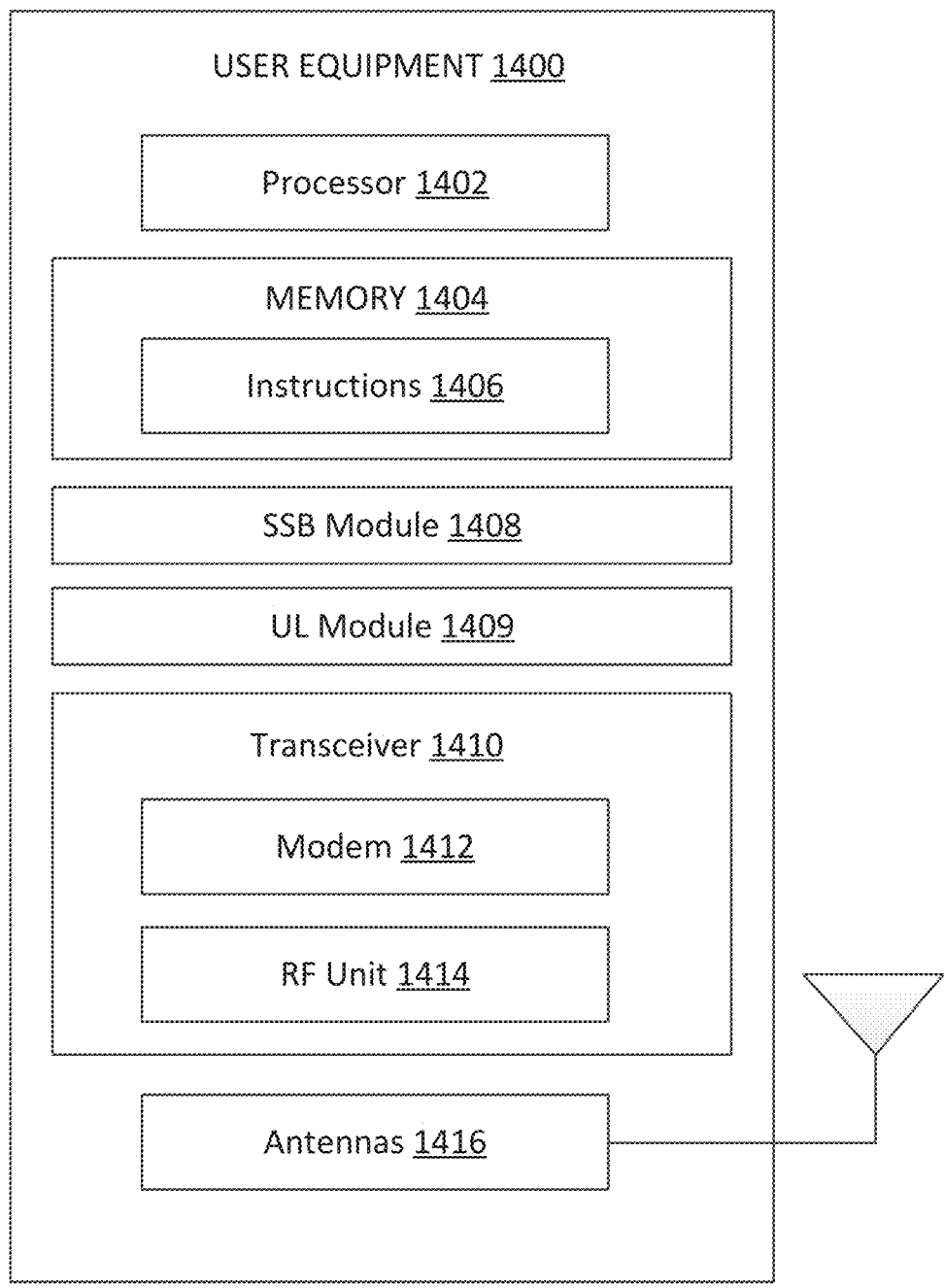
FIG. 14 is a block diagram of an exemplary user equipment (UE) according to some aspects of the present disclosure.

FIG. 14 is a block diagram of an exemplary UE 1400 according to some aspects of the present disclosure. The UE 1400 may be a UE 115 as discussed above with respect to FIG. 1. As shown, the UE 1400 may include a processor 1402, a memory 1404, an SSB module 1408, an UL module 1409, a transceiver 1410 including a modem subsystem 1412 and a radio frequency (RF) unit 1414, and one or more antennas 1416. These elements may be coupled with one another. The term "coupled" may refer to directly or indirectly coupled or connected to one or more intervening elements. For instance, these elements may be in direct or indirect communication with each other, for example via one or more buses.

The processor 1402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 1402 may also be implemented as a combination of computing devices, e.g., a combination of a DSP and a microprocessor, a plurality of microprocessors, one or more microprocessors in conjunction with a DSP core, or any other such configuration.

The memory 1404 may include a cache memory (e.g., a cache memory of the processor 1402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 1404 includes a non-transitory computer-readable medium. The memory 1404 may store, or have recorded thereon, instructions 1406. The instructions 1406 may include instructions that, when executed by the processor 1402, cause the processor 1402 to perform the operations described herein with reference to the UEs 115 in connection with aspects of the present disclosure, for example, aspects of FIGS. 2, 3A, 3B, 3C, and 4-12. Instructions 1406 may also be referred to as program code, which may be interpreted broadly to include any type of computer-readable statement(s) as discussed above with respect to FIG. 13.

Each of the SSB module 1408 and the UL module 1409 may be implemented via hardware, software, or combinations thereof. For example, each of the SSB module 1408 and the UL module 1409 may be implemented as a processor, circuit, and/or instructions 1406 stored in the memory 1404 and executed by the processor 1402. In some examples, the SSB module 1408 and the UL module 1409 can be integrated within the modem subsystem 1412. For example, the SSB module 1408 and the UL module 1409 can be implemented by a combination of software components (e.g., executed by a DSP or a general processor) and hardware components (e.g., logic gates and circuitry) within the modem subsystem 1412. In some examples, a BS may include one of the SSB module 1408 and the UL module 1409. In other examples, a BS may include both the SSB module 1408 and the UL module 1409.

The SSB module 1408 and the UL module 1409 may be used for various aspects of the present disclosure, for example, aspects of FIGS. 2, 3A, 3B, 3C, and 4-12. The SSB module 1408 is configured to receive an SSB transmission schedule from a BS (e.g., the BS 105 or 1300), determine whether the SSB transmission schedule is at least partially overlapping with the UL band in a first full-duplex slot, and perform SSB reception by excluding at least the UL band in the first full-duplex slot based on the SSB transmission schedule being at least partially overlapping with the UL band in the first full-duplex slot.

The SSB module 1408 may be configured to exclude the UL band from an SSB reception in a full-duplex slot using various techniques. In some instances, the SSB module 1408 is configured to refrain from decoding an SSB in the full-duplex slot based on an SSB muting pattern, for example, as discussed above with reference to FIG. 5. In some instances, the SSB module 1408 is configured to receive a first portion of an SSB in a first resource within a DL band in the first full-duplex slot based on the SSB transmission schedule and receive a second portion of the SSB in a second resource within the DL band based on the second portion of the SSB being scheduled within the UL band according to the SSB transmission schedule. The second resource may be adjacent to the first resource in frequency, for example, as discussed above with reference to FIGS. 7 and 8. In some instances, the SSB module 1408 is configured to receive an SSB in the full-duplex slot by applying a frequency-shifting to the SSB transmission schedule, for example, as discussed above with reference to FIG. 9. In some instances, the SSB module 1408 is configured to receive at least a first portion of an SSB in a first DL band in the first full-duplex slot and receive at least a second portion of the SSB in a second DL band within the first full-duplex slot for example, as discussed above with reference to FIG. 10. In some instances, the SSB module 1408 is configured to receive an SSB in the full-duplex slot during an extended period (e.g., using more symbols than as scheduled) such that the SSB may be completely transmitted within a DL band of the full-duplex slot, for example, as discussed above with reference to FIG. 11. In some instances, the SSB module 1408 is configured to receive a first set of SSBs in DL slots based on a first periodicity and receive a second set of SSBs in full-duplex slots based on a second periodicity different from the first periodicity, for example, as discussed above with reference to FIG. 12.

In some other aspects, the SSB module 1408 is configured to receive an SSB in the full-duplex slot with the SSB overlapping at least a portion of the UL band.

In some aspects, the SSB module 1408 is further configured to receive a preconfigured SSB transmission schedule, receive a slot format configuration (e.g., indicating DL slots, UL slots, and/or full-duplex slots), receive a SSB muting pattern, receive an SSB frequency-shifting configuration (for shifting an SSB schedule in frequency), receive an SSB splitting configuration (for splitting an SSB transmission into multiple portions), and/or receive an SSB transmission extension configuration (for extending transmission duration of an SSB) to facilitate SSB transmissions in full-duplex slots. Each configuration can be received via an RRC configuration or dynamic DCI in a PDCCH. Mechanisms for communicating SSBs with full-duplex communications are described in greater detail herein.

The UL module 1409 is configured to receive an UL allocation from a BS (e.g., the BSs 105 and/or 1300) in a UL band of a full-duplex slot and transmit a UL transmission according to the UL allocation. In some aspects, the UL module 1409 is configured to apply at least one of puncturing or rate-match to transmit a UL transmission in the full-duplex slot, for example, when the BS transmits an SSB overlapping with the UL band.

As shown, the transceiver 1410 may include the modem subsystem 1412 and the RF unit 1414. The transceiver 1410 can be configured to communicate bi-directionally with other devices, such as the BSs 105. The modem subsystem 1412 may be configured to modulate and/or encode the data from the memory 1404 and/or the SSB module 1408 according to a modulation and coding scheme (MCS), e.g., a low-density parity check (LDPC) coding scheme, a turbo coding scheme, a convolutional coding scheme, a digital beamforming scheme, etc. The RF unit 1414 may be configured to process (e.g., perform analog to digital conversion or digital to analog conversion, etc.) modulated/encoded data (e.g., PUSCH, PUCCH) from the modem subsystem 1412 (on outbound transmissions) or of transmissions originating from another source such as a UE 115 or a BS 105. The RF unit 1414 may be further configured to perform analog beamforming in conjunction with the digital beamforming. Although shown as integrated together in transceiver 1410, the modem subsystem 1412 and the RF unit 1414 may be separate devices that are coupled together at the UE 115 to enable the UE 115 to communicate with other devices.

The RF unit 1414 may provide the modulated and/or processed data, e.g. data packets (or, more generally, data messages that may include one or more data packets and other information), to the antennas 1416 for transmission to one or more other devices. The antennas 1416 may further receive data messages transmitted from other devices. The antennas 1416 may provide the received data messages for processing and/or demodulation at the transceiver 1410. The transceiver 1410 may provide the demodulated and decoded data (e.g., RRC configuration, SSB transmission schedule, slot format configuration, slot format reconfiguration, PDCCH DCI, SSBs, SSB muting pattern, SSB frequency-shifting configuration, SSB splitting configuration, UL allocation) to the SSB module 1408 for processing. The antennas 1416 may include multiple antennas of similar or different designs in order to sustain multiple transmission links. The RF unit 1414 may configure the antennas 1416.

In some aspects, the processor 1402 is configured to communicate with other components of the UE 1400 to determine whether an SSB transmission schedule is at least partially overlapping with an UL band in a first full-duplex slot and The transceiver 1410 is configured to communicate with other components of the UE 1400 to perform SSB reception by excluding at least the UL band in the first full-duplex slot based on the SSB transmission schedule being at least partially overlapping with the UL band in the first full-duplex slot.

In some aspects, the processor 1402 is configured to communicate with other components of the UE 1400 to determine whether an SSB is scheduled in a full-duplex slot and at least partially overlapping with an UL band in the full-duplex slot. The transceiver 1410 is configured to communicate with other components of the UE 1400 to receive a first portion of the SSB in a DL band in the full-duplex slot. The transceiver 1410 is also configured to receive a second portion of the SSB in the UL band in the full-duplex slot based on the SSB being scheduled in the full-duplex slot and at least partially overlapping with the UL band in the full-duplex slot.

In an aspect, the UE 1400 can include multiple transceivers 1410 implementing different RATs (e.g., NR and LTE). In an aspect, the UE 1400 can include a single transceiver 1410 implementing multiple RATs (e.g., NR and LTE). In an aspect, the transceiver 1410 can include various components, where different combinations of components can implement different RATs.

As discussed above in FIG. 1, in an IAB network, a BS 105 may function as an IAB-DU and as an IAB-MT. Thus, in some aspects, the components of the BS 1300 may also implement similar functions as components of the UE 1400 when operating as an IAB-MT.

Figure 15:
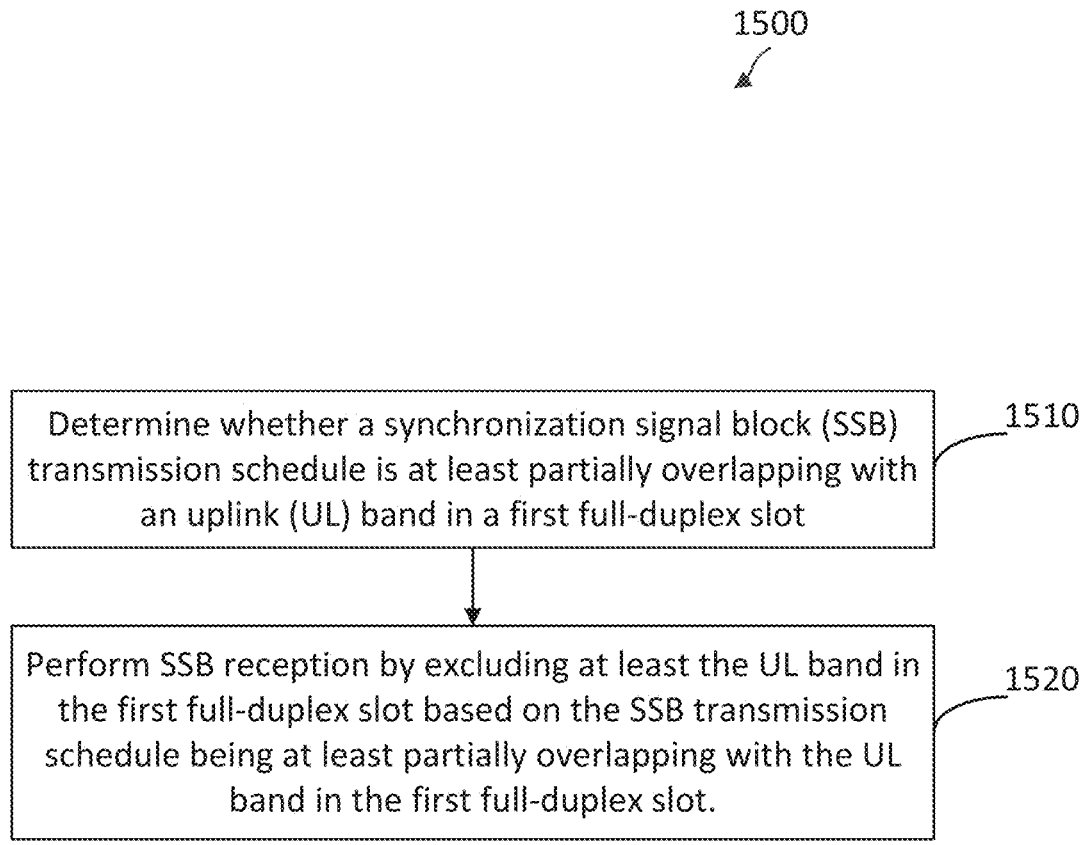
FIG. 15 is a flow diagram of a wireless communication method according to some aspects of the present disclosure.

FIG. 15 is a flow diagram of a wireless communication method 1500 according to some aspects of the present disclosure. Aspects of the method 1500 can be executed by a computing device (e.g., a processor, processing circuit, and/or other suitable component) of a wireless communication device or other suitable means for performing the steps. For example, a wireless communication device, such as a UE 115, a UE 1400, or an IAB-MT, may utilize one or more components, such as the processor 1402, the memory 1404, the SSB module 1408, the UL module 1409, the transceiver 1410, the modem 1412, and the one or more antennas 1416, to execute the steps of method 1500. The method 1500 may employ similar mechanisms as described above in FIGS. 2, 3A, 3B, 3C, and 4-12. As illustrated, the method 1500 includes a number of enumerated steps, but aspects of the method 1500 may include additional steps before, after, and in between the enumerated steps. In some aspects, one or more of the enumerated steps may be omitted or performed in a different order.

At block 1510, a wireless communication device determining whether an SSB transmission schedule (e.g., a preconfigured schedule for SSBs 410) is at least partially overlapping with an UL band (e.g., the UL band 424) in a first full-duplex slot (e.g., the full-duplex slot 404f). In some aspects, the wireless communication device is a UE (e.g., the UEs 115 and/or 1400). In some aspects, the wireless communication device is an IAB-MT (e.g., a BS 105 or a UE 115 as discussed in relation to FIG. 1). In some aspects, determining whether an SSB transmission schedule is at least partially overlapping with an UL band in a full-duplex slot may include receiving a SSB transmission schedule, where the SSB transmission schedule is at least partially overlapping with an UL frequency portion of a full-duplex slot. For instance, the full-duplex slot may include one or more subcarriers in frequency and one or more symbols in time, the UL frequency portion may span one or more subcarriers in frequency and one or more symbols in time within the full-duplex slot, and the SSB transmission schedule may include at least one resource (e.g., including one or more subcarriers in frequency and one or more symbols in time) at least partially overlapping with the UL frequency portion.

At block 1520, the wireless communication device performs SSB reception by excluding at least the UL band in the first full-duplex slot based on the SSB transmission schedule being at least partially overlapping with the UL band in the first full-duplex slot. In some instances, the wireless communication device may also exclude a guard band in the first full-duplex slot when performing the SSB reception. In some aspects, performing SSB reception may include receiving one or more SSBs, where the one or more SSBs are received in at least a slot different than the full-duplex slot or in a DL frequency portion of the full-duplex slot.

In some aspects, as part of performing the SSB reception at block 1520, the wireless communication device may refrain from decoding an SSB in the first full-duplex slot. In some aspects, the wireless communication device may further receive an SSB muting pattern indicating that an SSB transmission is muted in the first full-duplex slot, for example, as discussed above with reference to FIG. 5.

In some aspects, as part of performing the SSB reception at block 1520, the wireless communication device may receive a first portion of an SSB in a first resource within a DL band in the first full-duplex slot based on the SSB transmission schedule. The wireless communication device may also receive a second portion of the SSB in a second resource within the DL band based on the second portion of the SSB being scheduled within the UL band according to the SSB transmission schedule, the second resource being adjacent to the first resource in frequency, for example, as discussed above with reference to FIG. 7. In some aspects, the DL band is located at a higher frequency than the UL band in the first full-duplex slot, and as part of performing the SSB reception at block 1520, the wireless communication device may receive the second portion of the SSB in the second resource at a higher frequency than the first resource. In some aspects, the DL band is located at a lower frequency than the UL band in the first full-duplex slot, and as part of performing the SSB reception at block 1520, the wireless communication device may receive the second portion of the SSB in the second resource at a lower frequency than the first resource.

In some aspects, as part of performing the SSB reception at block 1520, the wireless communication device may receive an SSB in a DL band in the first full-duplex slot by applying a frequency-shift to the SSB transmission schedule, for example, as discussed above with reference to FIG. 9. In some aspects, as part of performing the SSB reception at block 1520, the wireless communication device may receive the SSB from a set of RBs within the DL band. The set of RBs may include a highest-frequency RB in the DL band. In some aspects, as part of performing the SSB reception at block 1520, the wireless communication device may receive the SSB from a set of RBs within the DL band. The set of RBs may include a lowest-frequency RB in the DL band. In some aspects, the DL band is located at a higher frequency than the UL band. In some aspects, the DL band is located at a lower frequency than the UL band. In some aspects, the wireless communication device may further receive a configuration indicating the frequency-shift for the SSB transmission schedule. In some aspects, the configuration may indicate at least one of a number of RBs, a number of REs, or a direction for shifting the SSB transmission schedule in frequency. In some aspects, as part of receiving the configuration, the wireless communication device may receive an RRC configuration indicating the frequency-shift for the SSB transmission schedule. In some aspects, as part of receiving the configuration, the wireless communication device may receive DCI indicating the frequency-shift for the SSB transmission schedule.

In some aspects, as part of performing the SSB reception at block 1520, the wireless communication device may receive at least a first portion of an SSB in a first DL band in the first full-duplex slot. The wireless communication device may also receive at least a second portion of the SSB in a second DL band within the first full-duplex slot. In some aspects, the first DL band and the second DL band correspond to the same frequency. In some aspects, the first DL band and the second DL band are spaced apart by the UL band in the first full-duplex slot, for example, as discussed above with reference to FIG. 10. In some aspects, at least one of the first DL band or the second DL band includes a smaller frequency BW than a BW of the SSB. In some aspects, at least one of the first DL band or the second DL band including less than 20 RBs. In some aspects, as part of performing the SSB reception at block 1520, the wireless communication device may receive the first portion of the SSB from a first set of RBs in the first DL band, the first set of RBs including at least one of a highest-frequency RB or a lowest-frequency RB in the first DL band. The wireless communication device may also receive the second portion of the SSB from a second set of RBs in the second DL band, the second set of RBs including at least one of a highest-frequency RB or a lowest-frequency RB in the second DL band. In some aspects, the SSB reception is performed based on a predetermined configuration at block 1520.

In some aspects, the wireless communication device may further receive a configuration for splitting the SSB into at least the first portion and the second portion. The configuration may indicate at least one of a number of RBs in the first portion of the SSB or a number of RBs in the second portion of the SSB. In some aspects, as part of receiving the configuration, the wireless communication device may receive an RRC configuration for splitting the SSB into the at least the first portion and the second portion. In some aspects, as part of receiving the configuration, the wireless communication device may receive DCI including the configuration for splitting the SSB into the at least the first portion and the second portion.

In some aspects, as part of performing the SSB reception at block 1520, the wireless communication device may receive an SSB in a DL band in the first full-duplex slot during an extended time period within the first full-duplex slot, for example, as discussed above with reference to FIG. 11. The extended time period may be extended from a scheduled period of the SSB transmission schedule.

In some aspects, as part of performing the SSB reception at block 1520, the wireless communication device may receive a first SSB in a DL band in the first full-duplex slot based on a first SSB transmission periodicity associated with full-duplex slots including the first full-duplex slot. The wireless communication device may also receive a second SSB in a first DL slot based on a second SSB transmission periodicity associated with DL slots including the first DL slot, for example, as discussed above with reference to FIG. 12.

Figure 16:
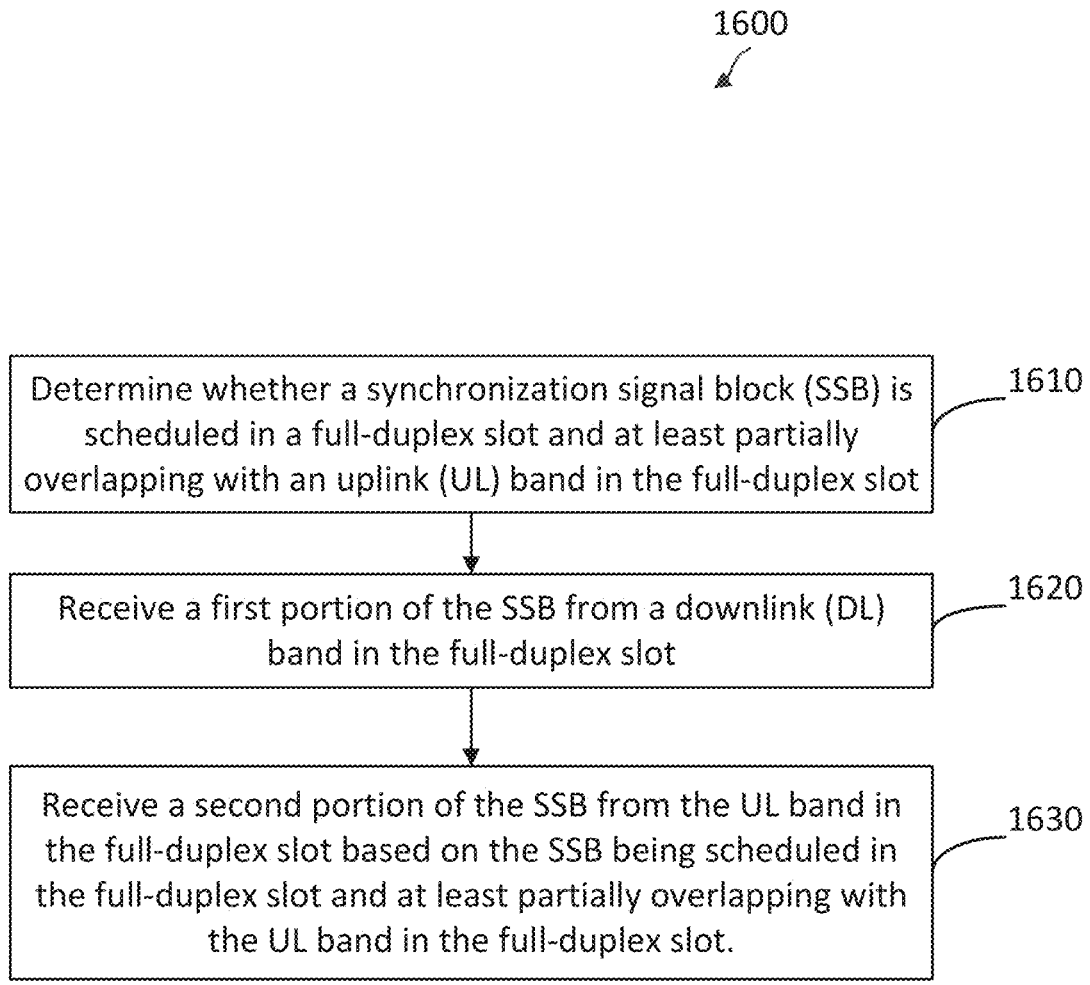
FIG. 16 is a flow diagram of a wireless communication method according to some aspects of the present disclosure.

FIG. 16 is a flow diagram of a wireless communication method 1600 according to some aspects of the present disclosure. Aspects of the method 1600 can be executed by a computing device (e.g., a processor, processing circuit, and/or other suitable component) of a wireless communication device or other suitable means for performing the steps. For example, a wireless communication device, such as a UE 115, a UE 1400, or an IAB-MT, may utilize one or more components, such as the processor 1402, the memory 1404, the SSB module 1408, the UL module 1409, the transceiver 1410, the modem 1412, and the one or more antennas 1416, to execute the steps of method 1600. The method 1600 may employ similar mechanisms as described above in FIGS. 2, 3A, 3B, 3C, and 4-12. As illustrated, the method 1600 includes a number of enumerated steps, but aspects of the method 1600 may include additional steps before, after, and in between the enumerated steps. In some aspects, one or more of the enumerated steps may be omitted or performed in a different order.

At block 1610, a wireless communication device determines whether an SSB (e.g., the SSBs 410 and/or 810) is scheduled in a full-duplex slot and at least partially overlapping with an UL band (e.g., the UL band 424) in the full-duplex slot (e.g., the full-duplex slot 404f). In some aspects, the wireless communication device is a UE (e.g., the UEs 115 and/or 1400). In some aspects, the wireless communication device is an IAB-MT (e.g., a BS 105 or a UE 115 as discussed in relation to FIG. 1). In some aspects, determining whether an SSB is scheduled in a full-duplex slot and at least partially overlapping with an UL band may include receiving a SSB transmission schedule, where the SSB transmission schedule is at least partially overlapping with an UL frequency portion of a full-duplex slot. For instance, the full-duplex slot may include one or more subcarriers in frequency and one or more symbols in time, the UL frequency portion may span one or more subcarriers in frequency and one or more symbols in time within the full-duplex slot, and the SSB transmission schedule may include at least one resource (e.g., including one or more subcarriers in frequency and one or more symbols in time) at least partially overlapping with the UL frequency portion.

At block 1620, the wireless communication device receives a first portion of the SSB from a downlink (DL) band in the full-duplex slot. In some aspects, receiving a first portion of the SSB may include receiving the first portion of the SSB in a DL frequency portion of the full-duplex slot.

At block 1630, the wireless communication device receives a second portion of the SSB from the UL band in the full-duplex slot based on the SSB being scheduled in the full-duplex slot and at least partially overlapping with the UL band in the full-duplex slot. In some aspects, receiving a second portion of the SSB may include receiving the second portion of the SSB in a DL frequency portion of the full-duplex slot. In some aspects, second portion of the SSB is received in the UL band based on the DL band having a BW less than a BW of the SSB. In some aspects, the second portion of the SSB is received in the UL band based on the DL band having less than 20 RBs. In some aspects, the second portion of the SSB is punctured.

In some aspects, the wireless communication device may further refrain from transmitting an UL communication signal in UL band during the full-duplex slot based on the second portion of the SSB being within the UL band. In some aspects, the wireless communication device may further transmit an UL communication signal in the UL band based on a rate-match around the second portion of the SSB. In some aspects, the wireless communication device may further transmit an UL communication signal in the UL band based on puncturing a portion of the UL communication signal that is overlapping with the second portion of the SSB.

Figure 17:
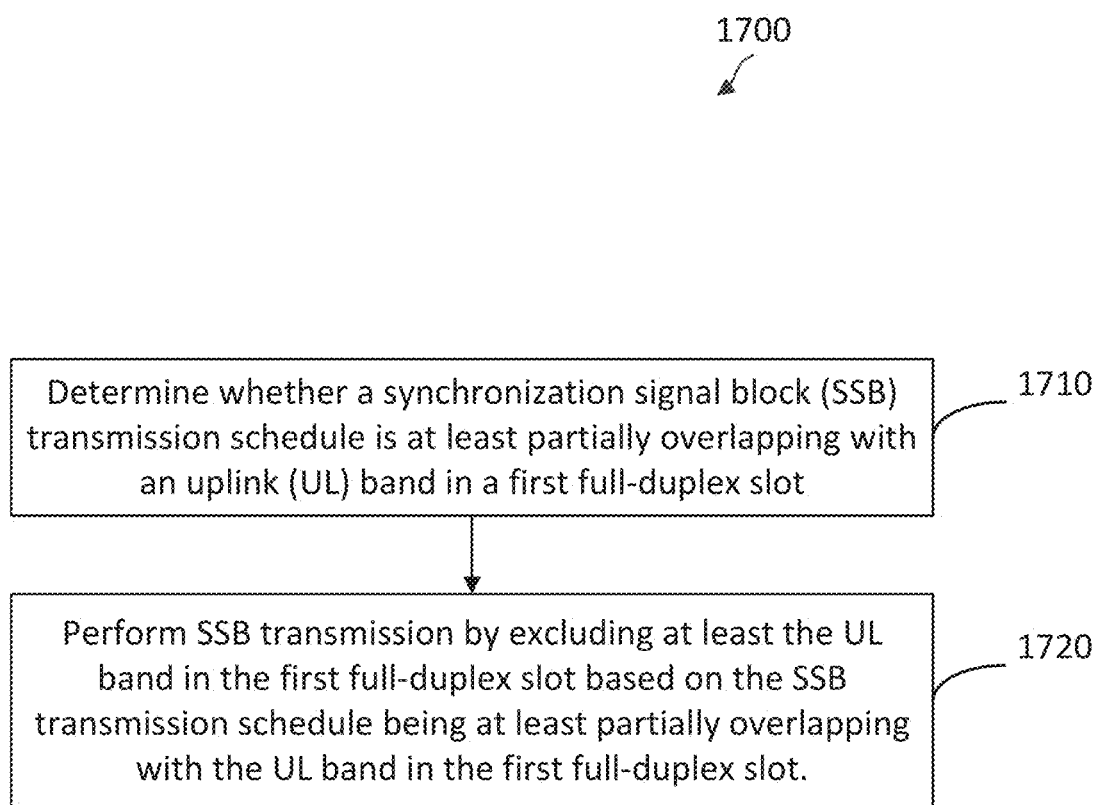
FIG. 17 is a flow diagram of a wireless communication method according to some aspects of the present disclosure.

FIG. 17 is a flow diagram of a wireless communication method 1700 according to some aspects of the present disclosure. Aspects of the method 1700 can be executed by a computing device (e.g., a processor, processing circuit, and/or other suitable component) of a wireless communication device or other suitable means for performing the steps. For example, a wireless communication device, such as a BS 105 or a BS 1300, may utilize one or more components, such as the processor 1302, the memory 1304, the SSB module 1308, the UL module 1309, the transceiver 1310, the modem 1312, and the one or more antennas 1316, to execute the steps of method 1700. The method 1700 may employ similar mechanisms as described above in FIGS. 2, 3A, 3B, 3C, and 4-12. As illustrated, the method 1700 includes a number of enumerated steps, but aspects of the method 1700 may include additional steps before, after, and in between the enumerated steps. In some aspects, one or more of the enumerated steps may be omitted or performed in a different order.

At block 1710, a BS determines whether an SSB transmission schedule (e.g., a preconfigured schedule for SSBs 410) is at least partially overlapping with an UL band (e.g., the UL band 424) in a first full-duplex slot (e.g., the full-duplex slot 404f). In some aspects, determining whether an SSB transmission schedule is at least partially overlapping with an UL band in a full-duplex slot may include receiving a SSB transmission schedule, where the SSB transmission schedule is at least partially overlapping with an UL frequency portion of a full-duplex slot. For instance, the full-duplex slot may include one or more subcarriers in frequency and one or more symbols in time, the UL frequency portion may span one or more subcarriers in frequency and one or more symbols in time within the full-duplex slot, and the SSB transmission schedule may include at least one resource (e.g., including one or more subcarriers in frequency and one or more symbols in time) at least partially overlapping with the UL frequency portion.

At block 1720, the BS performs SSB transmission by excluding at least the UL band in the first full-duplex slot based on the SSB transmission schedule being at least partially overlapping with the UL band in the first full-duplex slot. In some instances, the BS may also exclude a guard band in the first full-duplex slot when performing the SSB transmission. In some aspects, performing SSB transmission may include transmitting one or more SSBs, where the one or more SSBs are transmitted in at least a slot different than the full-duplex slot or in a DL frequency portion of the full-duplex slot.

In some aspects, as part of performing the SSB transmission at block 1720, the BS may refrain from transmitting an SSB in the first full-duplex slot. In some aspects, the BS may further transmit an SSB muting pattern indicating that an SSB transmission is muted in the first full-duplex slot, for example, as discussed above with reference to FIG. 5.

In some aspects, as part of performing the SSB transmission at block 1720, the BS may transmit a first portion of an SSB in a first resource within a DL band in the first full-duplex slot based on the SSB transmission schedule. The BS may also transmit a second portion of the SSB in a second resource within the DL band based on the second portion of the SSB being scheduled within the UL band according to the SSB transmission schedule, for example, as discussed above with reference to FIG. 7. The second resource may be adjacent to the first resource in frequency. In some aspects, the DL band is located at a higher frequency than the UL band in the first full-duplex slot, and as part of performing the SSB transmission at block 1720, the BS may transmit the second portion of the SSB in the second resource at a higher frequency than the first resource. In some aspects, the DL band is located at a lower frequency than the UL band in the first full-duplex slot, and as part of performing the SSB transmission at block 1720, the BS may transmit the second portion of the SSB in the second resource at a lower frequency than the first resource.

In some aspects, as part of performing the SSB transmission at block 1720, the BS may transmit an SSB in a DL band in the first full-duplex slot by applying a frequency-shift to the SSB transmission schedule, for example, as discussed above with reference to FIG. 9. In some aspects, as part of performing the SSB transmission at block 1720, the BS may transmit the SSB from a set of RBs within the DL band, the set of RBs including a highest-frequency RB in the DL band. In some aspects, as part of performing the SSB transmission at block 1720, the BS may transmit the SSB from a set of RBs within the DL band, the set of RBs including a lowest-frequency RB in the DL band. In some aspects, the DL band is located at a higher frequency than the UL band. In some aspects, the DL band is located at a lower frequency than the UL band. In some aspects, the BS may further transmit a configuration indicating the frequency-shift for the SSB transmission schedule. In some aspects, the configuration may indicate at least one of a number of RBs, a number of REs, or a direction for shifting the SSB transmission schedule in frequency. In some aspects, as part of transmitting the configuration, the BS may transmit an RRC configuration indicating the frequency-shift for the SSB transmission schedule. In some aspects, as part of transmitting the configuration, the BS may transmit DCI indicating the frequency-shift for the SSB transmission schedule.

In some aspects, as part of performing the SSB transmission at block 1720, the BS may transmit at least a first portion of an SSB in a first downlink (DL) band in the first full-duplex slot. The BS may also transmit at least a second portion of the SSB in a second DL band within the first full-duplex slot. In some aspects, the first DL band and the second DL band correspond to the same frequency. In some aspects, the first DL band and the second DL band are spaced apart by the UL band in the first full-duplex slot, for example, as discussed above with reference to FIG. 11. In some aspects, at least one of the first DL band or the second DL band includes a smaller frequency BW than a BW of the SSB. In some aspects, at least one of the first DL band or the second DL band including less than 20 RBs. In some aspects, as part of performing the SSB transmission at block 1720, the BS may transmit the first portion of the SSB in a first set of RBs in the first DL band, the first set of RBs including at least one of a highest-frequency RB or a lowest-frequency RB in the first DL band. The BS may also transmit the second portion of the SSB in a second set of RBs in the second DL band, the second set of RBs including at least one of a highest-frequency RB or a lowest-frequency RB in the second DL band. In some aspects, the SSB transmission may be performed based on a predetermined configuration at block 1720. In some aspects, the BS may further transmit a configuration for splitting the SSB into at least the first portion and the second portion, the configuration indicating at least one of a number of RBs in the first portion of the SSB or a number of RBs in the second portion of the SSB. In some aspects, as part of transmitting the configuration, the BS may transmit an RRC configuration for splitting the SSB into the at least the first portion and the second portion. In some aspects, as part of transmitting the configuration, the BS may transmit DCI including the configuration for splitting the SSB into the at least the first portion and the second portion.

In some aspects, as part of performing the SSB transmission at block 1720, the BS may transmit an SSB in a DL band in the first full-duplex slot during an extended time period within the first full-duplex slot, the extended time period being extended from a scheduled period of the SSB transmission schedule, for example, as discussed above with reference to FIG. 11.

In some aspects, as part of performing the SSB transmission at block 1720, the BS may transmit a first SSB in a DL band in the first full-duplex slot based on a first SSB transmission periodicity associated with full-duplex slots including the first full-duplex slot. The BS may also transmit a second SSB in a first DL slot based on a second SSB transmission periodicity associated with DL slots including the first DL slot, for example, as discussed above with reference to FIG. 12.

In some aspects, as part of performing the SSB transmission at block 1720, the BS may transmit an SSB in the first full-duplex slot based on puncturing a portion of the SSB overlapping with the UL band, for example, as discussed above with reference to FIGS. 6, 7, and 8.

In some aspects, the BS may further configure the DL band based on a BW of the SSB.

Figure 18:
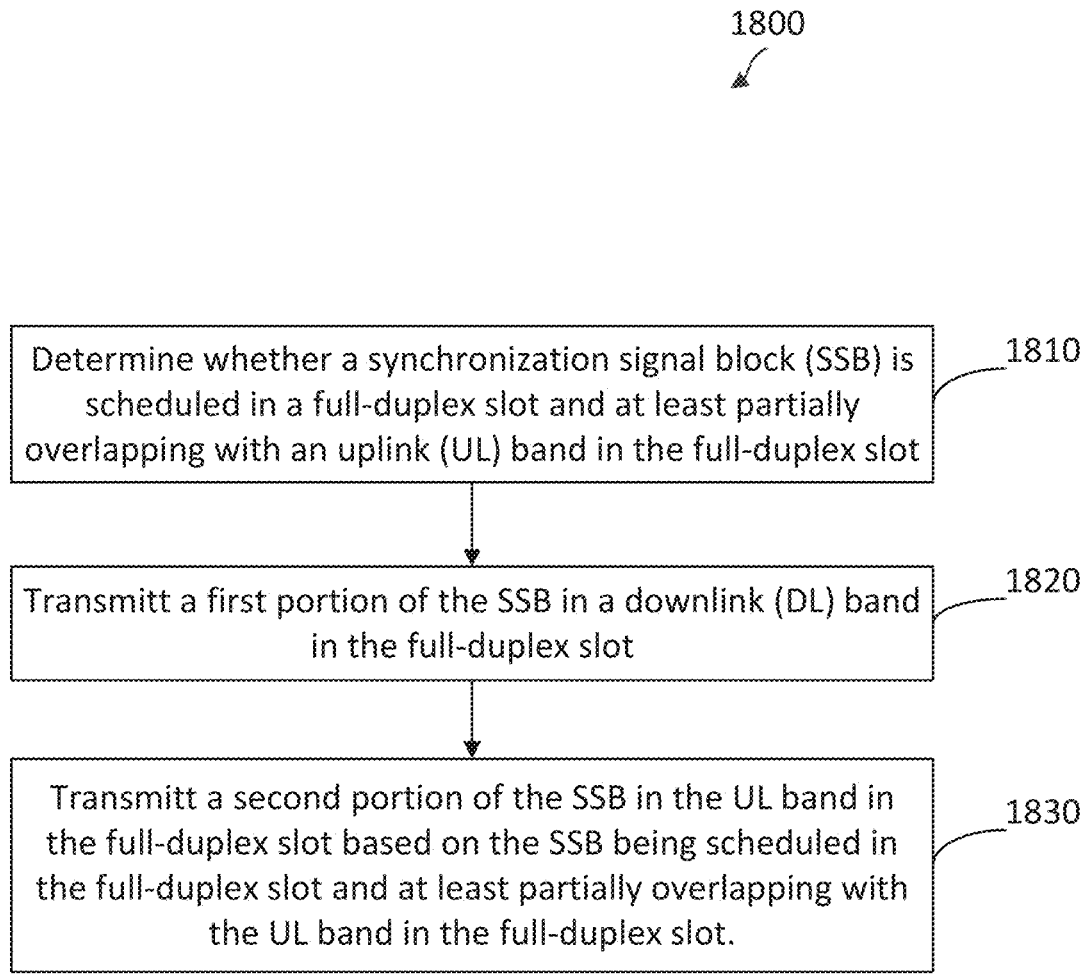
FIG. 18 is a flow diagram of a wireless communication method according to some aspects of the present disclosure.

FIG. 18 is a flow diagram of a wireless communication method 1800 according to some aspects of the present disclosure. Aspects of the method 1800 can be executed by a computing device (e.g., a processor, processing circuit, and/or other suitable component) of a wireless communication device or other suitable means for performing the steps. For example, a wireless communication device, such as a BS 105 or a BS 1300, may utilize one or more components, such as the processor 1302, the memory 1304, the SSB module 1308, the UL module 1309, the transceiver 1310, the modem 1312, and the one or more antennas 1316, to execute the steps of method 1800. The method 1800 may employ similar mechanisms as described above in FIGS. 2, 3A, 3B, 3C, and 4-12. As illustrated, the method 1800 includes a number of enumerated steps, but aspects of the method 1800 may include additional steps before, after, and in between the enumerated steps. In some aspects, one or more of the enumerated steps may be omitted or performed in a different order.

At block 1810, a BS determines whether an SSB (e.g., the SSBs 410 and/or 810) is scheduled in a full-duplex slot (e.g., the full-duplex slot 404*f*) and at least partially overlapping with an UL band (e.g., the UL band 424) in the full-duplex slot. In some aspects, determining whether an SSB is scheduled in a full-duplex slot and at least partially overlapping with an UL band may include transmitting a SSB transmission schedule, where the SSB transmission schedule is at least partially overlapping with an UL frequency portion of a full-duplex slot. For instance, the full-duplex slot may include one or more subcarriers in frequency and one or more symbols in time, the UL frequency portion may span one or more subcarriers in frequency and one or more symbols in time within the full-duplex slot, and the SSB transmission schedule may include at least one resource (e.g., including one or more subcarriers in frequency and one or more symbols in time) at least partially overlapping with the UL frequency portion.

At block 1820, the BS transmits a first portion of the SSB in a DL band (e.g., the DL bands 422*a* and 422*b*) in the full-duplex slot. In some aspects, transmitting a first portion of the SSB may include transmitting the first portion of the SSB in a DL frequency portion of the full-duplex slot.

At block 1830, the BS transmits a second portion of the SSB in the UL band in the full-duplex slot based on the SSB being scheduled in the full-duplex slot and at least partially overlapping with the UL band in the full-duplex slot. In some aspects, transmitting a second portion of the SSB may include transmitting the second portion of the SSB in a DL frequency portion of the full-duplex slot. In some aspects, the second portion of the SSB is transmitted in the UL band based on the DL band having a BW less than a BW of the SSB. In some aspects, the second portion of the SSB is transmitted in the UL band based on the DL band having less than 20 RBs.

In some aspects, the BS may further refrain from receiving an UL communication signal in UL band during the full-duplex slot based on the second portion of the SSB being within the UL band. In some aspects, the BS may further receive an UL communication signal (e.g., a PUSCH) in the UL band based on a rate-match around the second portion of the SSB.

Further aspects of the present disclosure are provided below.

Aspect 1 includes a method of wireless communication performed by a wireless communication device, the method including determining whether a synchronization signal block (SSB) is scheduled in a full-duplex slot and at least partially overlapping with an uplink (UL) band in the full-duplex slot; receiving a first portion of the SSB from a downlink (DL) band in the full-duplex slot; and receiving a second portion of the SSB from the UL band in the full-duplex slot based on the SSB being scheduled in the full-duplex slot and at least partially overlapping with the UL band in the full-duplex slot. In some aspects, determining whether an SSB is scheduled in a full-duplex slot and at least partially overlapping with an UL band may include receiving a SSB transmission schedule, where the SSB transmission schedule is at least partially overlapping with an UL frequency portion of a full-duplex slot. In some aspects, receiving a first portion of the SSB may include receiving the first portion of the SSB in a DL frequency portion of the full-duplex slot. In some aspects, receiving a second portion of the SSB may include receiving the second portion of the SSB in a DL frequency portion of the full-duplex slot.

Aspect 2 includes the method of aspect 1, where the second portion of the SSB is punctured.

Aspect 3 includes the method of any of aspects 1-2, further comprising refraining from transmitting an UL communication signal in UL band during the full-duplex slot based on the second portion of the SSB being within the UL band.

Aspect 4 includes the method of any of aspects 1-2, further comprising transmitting an UL communication signal in the UL band based on a rate-match around the second portion of the SSB.

Aspect 5 includes the method of any of aspects 1-2, further comprising transmitting an UL communication signal in the UL band based on puncturing a portion of the UL communication signal that is overlapping with the second portion of the SSB.

Aspect 6 includes the method of any of aspects 1-5, further comprising receiving an UL allocation that is at least partially overlapping with SSB scheduled in the full-duplex slot.

Aspect 7 includes the method of aspect 1, where the receiving the second portion of the SSB further includes receiving the second portion of the SSB in the UL band based on the DL band having a bandwidth (BW) less than a BW of the SSB.

Aspect 8 includes the method of any of aspects 1, or 3-7, where the receiving the second portion of the SSB includes receiving the second portion of the SSB in the UL band based on the DL band having less than 20 resource blocks (RBs).

Aspect 9 includes the method of any of aspects 1-8, where the wireless communication device is a user equipment (UE).

Aspect 10 includes the method of any of aspects 1-8, where the wireless communication device is an integrated access backhaul-mobile termination (IAB-MT).

Aspect 11 includes a method of wireless communication performed by a base station, including determining whether a synchronization signal block (SSB) is scheduled in a full-duplex slot and at least partially overlapping with an uplink (UL) band in the full-duplex slot; transmitting a first portion of the SSB in a downlink (DL) band in the full-duplex slot; and transmitting a second portion of the SSB in the UL band in the full-duplex slot based on the SSB being scheduled in the full-duplex slot and at least partially overlapping with the UL band in the full-duplex slot. In some aspects, determining whether an SSB is scheduled in a full-duplex slot and at least partially overlapping with an UL band may include transmitting a SSB transmission schedule, where the SSB transmission schedule is at least partially overlapping with an UL frequency portion of a full-duplex slot. In some aspects, transmitting a first portion of the SSB may include transmitting the first portion of the SSB in a DL frequency portion of the full-duplex slot. In some aspects, transmitting a second portion of the SSB may include transmitting the second portion of the SSB in a DL frequency portion of the full-duplex slot.

Aspect 12 includes the method of aspect 11, further comprising refraining from receiving an UL communication signal in UL band during the full-duplex slot based on the second portion of the SSB being within the UL band.

Aspect 13 includes the method of any of aspects 11-12, further comprising receiving an UL communication signal in the UL band based on a rate-match around the second portion of the SSB.

Aspect 14 includes the method of any of aspects 11-13, further comprising transmitting an UL allocation that is at least partially overlapping with SSB scheduled in the full-duplex slot.

Aspect 15 includes the method of any of aspects 11, or 13-14, wherein the transmitting the second portion of the SSB further comprises transmitting the second portion of the SSB in the UL band based on the DL band having a bandwidth (BW) less than a BW of the SSB.

Aspect 16 includes an apparatus comprising a memory, a transceiver, and a processor coupled to the memory and the transceiver, wherein the processor and the transceiver are configured to perform the method of any one of aspects 1-10.

Aspect 17 includes an apparatus comprising a memory, a transceiver, and a processor coupled to the memory and the transceiver, wherein the processor and the transceiver are configured to perform the method of any one of aspects 11-15.

Aspect 18 includes an apparatus comprising means (e.g., the processor 1402, the memory 1404, the SSB module 1408, the UL module 1409, the transceiver 1410, the modem 1412, and the one or more antennas 1416 of FIG. 14) for performing the method of any one of aspects 1-10.

Aspect 19 includes an apparatus comprising means (e.g., the processor 1302, the memory 1304, the SSB module 1308, the UL module 1309, the transceiver 1310, the modem 1312, and the one or more antennas 1316 of FIG. 13) for performing the method of any one of aspects 11-15.

Aspect 20 includes a non-transitory computer readable medium including program code, which when executed by one or more processors, causes a wireless communication device to perform the method of any one of aspects 1-10.

Aspect 21 includes a non-transitory computer readable medium including program code, which when executed by one or more processors, causes a wireless communication device to perform the method of any one of aspects 11-15.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication performed by a wireless communication device, comprising:
    receiving a synchronization signal block (SSB) transmission schedule, the SSB transmission schedule at least partially overlapping with an uplink (UL) frequency portion of a full-duplex slot, the full-duplex slot including the UL frequency portion over one or more subcarriers and a downlink (DL) frequency portion over one or more subcarriers overlapping in time;
    receiving a first portion of a SSB in the DL frequency portion of the full-duplex slot; and
    receiving a second portion of the SSB in the UL frequency portion of the full-duplex slot based on the SSB being scheduled in the full-duplex slot and at least partially overlapping with the UL frequency portion of the full-duplex slot.

2. The method of claim 1, further comprising:
    refraining from transmitting an UL communication signal in the UL frequency portion of the full-duplex slot based on the second portion of the SSB, the second portion being within the UL frequency portion.

3. The method of claim 1, further comprising:
    transmitting an UL communication signal in the UL frequency portion of the full-duplex slot based on a rate-match associated with the second portion of the SSB.

4. The method of claim 1, further comprising:
    transmitting an UL communication signal in the UL frequency portion of the full-duplex slot based on puncturing a portion of the UL communication signal that is overlapping with the second portion of the SSB.

5. The method of claim 1, further comprising:
    receiving an UL allocation that is at least partially overlapping with the SSB scheduled in the full-duplex slot.

6. The method of claim 1, wherein further comprising:
    receiving the second portion of the SSB in the UL frequency portion of the full-duplex slot based on the DL frequency portion of the full-duplex slot having a bandwidth (BW) less than a BW of the SSB.

7. The method of claim 1, wherein the receiving the second portion of the SSB comprises:
    receiving the second portion of the SSB in the UL frequency portion of the full-duplex slot based on the DL frequency portion of the full-duplex slot having less than 20 resource blocks (RBs).

8. The method of claim 1, wherein the wireless communication device is a user equipment (UE).

9. The method of claim 1, wherein the wireless communication device is an integrated access backhaul-mobile termination (IAB-MT).

10. A method of wireless communication performed by a wireless communication device, comprising:
    transmitting a synchronization signal block (SSB) transmission schedule, the SSB transmission schedule at least partially overlapping with an uplink (UL) frequency portion of a full-duplex slot, the full-duplex slot including the UL frequency portion over one or more subcarriers and a downlink (DL) frequency portion over one or more subcarriers overlapping in time;

transmitting a first portion of a SSB in the DL frequency portion of the full-duplex slot; and transmitting a second portion of the SSB in the UL frequency portion of the full-duplex slot based on the SSB being scheduled in the full-duplex slot and at least partially overlapping with the UL frequency portion of the full-duplex slot.

11. The method of claim 10, further comprising:
receiving an UL communication signal in the UL frequency portion of the full-duplex slot based on a rate-match associated with the second portion of the SSB.

12. The method of claim 11, wherein the wireless communication device is at least one of a base station, a centralized unit, or a distributed unit.

13. The method of claim 10, further comprising:
transmitting an UL allocation that is at least partially overlapping with SSB scheduled in the full-duplex slot.

14. The method of claim 10, further comprising:
transmitting the second portion of the SSB in the UL frequency portion of the full-duplex slot based on the DL frequency portion having a bandwidth (BW) less than a BW of the SSB.

15. The method of claim 10, further comprising:
transmitting the second portion of the SSB in the UL frequency portion of the full-duplex slot based on the DL frequency portion having less than 20 resource blocks (RBs).

16. A wireless communication device comprising:
a memory;
a transceiver; and
at least one processor coupled to the memory and the transceiver, wherein the wireless communication device is configured to:
receive a synchronization signal block (SSB) transmission schedule, the SSB transmission schedule at least partially overlapping with an uplink (UL) frequency portion of a full-duplex slot, the full-duplex slot including the UL frequency portion over one or more subcarriers and a downlink (DL) frequency portion over one or more subcarriers overlapping in time;
receive, via the transceiver, a first portion of a SSB from the DL frequency portion of the full-duplex slot; and
receive, via the transceiver, a second portion of the SSB from the UL frequency portion of the full-duplex slot based on the SSB being scheduled in the full-duplex slot and at least partially overlapping with the UL frequency portion of the full-duplex slot.

17. The wireless communication device of claim 16, wherein the wireless communication device is further configured to:
refrain from transmitting an UL communication signal in UL frequency portion of the full-duplex slot based on the second portion of the SSB being within the UL frequency portion.

18. The wireless communication device of claim 16, wherein the wireless communication device is further configured to:
transmit an UL communication signal in the UL frequency portion of the full-duplex slot based on a rate-match associated with the second portion of the SSB.

19. The wireless communication device of claim 16, wherein the wireless communication device is further configured to:

transmit an UL communication signal in the UL frequency portion of the full-duplex slot based on puncturing a portion of the UL communication signal that is overlapping with the second portion of the SSB.

20. The wireless communication device of claim 16, wherein the wireless communication device is further configured to:
receive an UL allocation that is at least partially overlapping with the SSB scheduled in the full-duplex slot.

21. The wireless communication device of claim 16, wherein the wireless communication device is further configured to:
receive the second portion of the SSB in the UL frequency portion of the full-duplex slot based on the DL frequency portion having a bandwidth (BW) less than a BW of the SSB.

22. The wireless communication device of claim 16, wherein the wireless communication device is further configured to:
receive the second portion of the SSB in the UL frequency portion of the full-duplex slot based on the DL frequency portion having less than 20 resource blocks (RBs).

23. The wireless communication device of claim 16, wherein the wireless communication device is a user equipment (UE).

24. The wireless communication device of claim 16, wherein the wireless communication device is an integrated access backhaul-mobile termination (IAB-MT).

25. A wireless communication device comprising:
a memory;
a transceiver; and
at least one processor coupled to the memory and the transceiver, wherein the wireless communication device is configured to:
transmit a synchronization signal block (SSB) transmission schedule, the SSB transmission schedule at least partially overlapping with an uplink (UL) frequency portion of a full-duplex slot, the full-duplex slot including the UL frequency portion over one or more subcarriers and a downlink (DL) frequency portion over one or more subcarriers overlapping in time;
transmit, via the transceiver, a first portion of a SSB in the DL frequency portion of the full-duplex slot; and
transmit, via the transceiver, a second portion of the SSB in the UL frequency portion of the full-duplex slot based on the SSB being scheduled in the full-duplex slot and at least partially overlapping with the UL frequency portion of the full-duplex slot.

26. The wireless communication device of claim 25, wherein the wireless communication device is further configured to:
refrain from receiving an UL communication signal in UL frequency portion of the full-duplex slot based on the second portion of the SSB being within the UL frequency portion.

27. The wireless communication device of claim 25, wherein the wireless communication device is further configured to:
receive an UL communication signal in the UL frequency portion of the full-duplex slot based on a rate-match associated with the second portion of the SSB.

28. The wireless communication device of claim 25, wherein the wireless communication device is further configured to:

transmit the second portion of the SSB in the UL frequency portion of the full-duplex slot based on the DL frequency portion having a bandwidth (BW) less than a BW of the SSB.

29. The wireless communication device of claim 25, wherein the wireless communication device is further configured to:
   transmit the second portion of the SSB in the UL frequency portion of the full-duplex slot based on the DL frequency portion of having less than 20 resource blocks (RBs).

30. The wireless communication device of claim 25, wherein the wireless communication device is at least one of a base station, a centralized unit, or a distributed unit.

* * * * *